US007707052B2

(12) United States Patent
Kuhn et al.

(10) Patent No.: US 7,707,052 B2
(45) Date of Patent: Apr. 27, 2010

(54) MONITORING EMPLOYMENT COMPENSATION

(75) Inventors: Hardy Kuhn, Sandhausen (DE); David Lim, Fremont, CA (US); Matthias Richter, Sinsheim (DE); Peter Sieber, Wiesloch (DE); Sandra Fusser, Bad Schoenborn (DE); Jose Gonzalez Seco, Walldorf (DE); Oswald Gschnitzer, Heidelberg (DE); Peter Weddeling, Sinsheim (DE)

(73) Assignee: SAP, Walldorf (DE)

( * ) Notice: Subject to any disclaimer, the term of this patent is extended or adjusted under 35 U.S.C. 154(b) by 1038 days.

(21) Appl. No.: 10/819,715

(22) Filed: Apr. 6, 2004

(65) Prior Publication Data

US 2005/0192823 A1 Sep. 1, 2005

Related U.S. Application Data

(60) Provisional application No. 60/548,255, filed on Feb. 27, 2004.

(51) Int. Cl.
G06Q 40/00 (2006.01)
(52) U.S. Cl. .............................. 705/7; 705/1
(58) Field of Classification Search ........................ 705/7
See application file for complete search history.

(56) References Cited

U.S. PATENT DOCUMENTS 5,426,781 A * 6/1995 Kaplan et al. ............... 707/4
5,819,231 A * 10/1998 Tremaine ..................... 705/7
6,587,832 B1 * 7/2003 Beck et al. .................... 705/9
6,735,571 B2 * 5/2004 Coleman et al. .............. 705/7
7,069,266 B2 * 6/2006 Calderaro et al. ............. 707/9
2002/0143752 A1 * 10/2002 Plunkett et al. ............... 707/3
2002/0188542 A1 * 12/2002 Zhang et al. ................. 705/36
2004/0201588 A1 * 10/2004 Meanor et al. ............. 345/440

OTHER PUBLICATIONS

Ref #C—http://web.archive.org/web/20011102145534/www.opm.gov/oca/01tables/SSR/html/0290.htm, WayBack Machine, Archive date of Nov. 10, 2001 (2 pgs).*
http://web.archive.org/web/20011211184011/www.opm.gov/oca/01tables/SSR/index.htm, WayBack Machine, Archive date of Dec. 11, 2001 (2 pgs).*

(Continued)

Primary Examiner—Kambiz Abdi
Assistant Examiner—Sarah M Monfeldt
(74) Attorney, Agent, or Firm—Finnegan, Henderson, Farabow, Garrett & Dunner, L.L.P.

(57) ABSTRACT

A method includes receiving compensation information of a particular employee of a first company from a database, receiving compensation information associated with a second company from a different database, and presenting in a graphical user interface (GUI) a graphical representation comparing the compensation information of the particular employee of the first company and the compensation information associated with the second company.

27 Claims, 21 Drawing Sheets

OTHER PUBLICATIONS

Ref #B—http://web.archive.org/web/20010808040352/www.opm.gov/oca/01tables/SSR/html/0029.htm, WayBack Machine, Archive date of: Aug. 8, 2001 (5 pgs).*

Ref #A—http://web.archive.org/web/20011212043913/www.opm.gov/oca/payrates/index.htm, WayBack Machine, Archive date of Dec. 12, 2001 (2 pgs).* http://web.archive.org/web/*/http://www.opm.gov/oca/01tables, WayBack Machine Results for: http://www.opm.gov/oca/01tables (1 pg).*

Ref #D—http://web.archive.org/web/20011213230021/www.opm.gov/oca/01tables/SSR/html/999A.htm, WayBack Machine, Archive date of: Dec. 13, 2001 (2 pgs).*

Ref #E—http://web.archive.org/web/20011203164358/www.opm.gov/oca/01tables/SSR/html/999B.htm, WayBack Machine, Archive date of: Dec. 3, 2001 (2 pgs).*

Michael A. Miller, "The public-private pay debate: what do the data show?", Monthly Labor Review, May 1996, p. 18-29.* http://web.archive.org/web/20000823093615/www.opm.gov/oca/99TABLES/GSannual/fsc/99GSf.htm.* http://web.archive.org/web/20001206041000/www.opm.gov/oca/98TABLES/GSANNUAL/HTML/gs.htm.*

Langbein, Laura I. ; Lewis, Gregory B.; Pay, productivity, and the public sector: the case of electrical engineers, Journal of Public Administration Research and Theory Article date: Jul. 1, 1998.*

Measuring Differences Between Federal and Private Pay; Nov. 2002; A CBO Paper; The Congress of the United States—Congressional Budget Office.*

* cited by examiner

| Grade | Level | Planned Minimum | Planned Ref. Salary | Planned Maximum | Difference % Min | Difference % Ref | Difference % Max | Crcy | Unit of Time |
|---|---|---|---|---|---|---|---|---|---|
| GRD01 | 01 | 1,300,00 | 1,400,00 | 1,500,00 | 23,81 | 0,00 | 15,38- | USD | Semi-monthly |
| GRD01 | 02 | 1,500,00 | 1,600,00 | 1,700,00 | 15,38 | 0,00 | 9,68- | USD | Semi-monthly |
| GRD01 | 03 | 1,700,00 | 1,800,00 | 1,900,00 | 9,68 | 0,00 | 0,00 | USD | Semi-monthly |
| GRD02 | 01 | 1,800,00 | 1,900,00 | 2,100,00 | 5,88 | 0,00 | 2,44- | USD | Semi-monthly |
| GRD02 | 02 | 2,100,00 | 2,200,00 | 2,300,00 | 2,44 | 0,00 | 4,17- | USD | Semi-monthly |
| GRD02 | 03 | 2,300,00 | 2,400,00 | 2,500,00 | 4,17- | 0,00 | 9,09- | USD | Semi-monthly |
| GRD03 | 01 | 2,400,00 | 2,500,00 | 2,600,00 | 5,88- | 0,00 | 7,14- | USD | Semi-monthly |
| GRD03 | 02 | 2,600,00 | 2,700,00 | 2,800,00 | 7,14- | 0,00 | 11,11- | USD | Semi-monthly |
| GRD03 | 03 | 2,800,00 | 3,000,00 | 3,300,00 | 11,11- | 0,00 | 5,71- | USD | Semi-monthly |

Line From 9

FIG. 20

MONITORING EMPLOYMENT COMPENSATION

CROSS-REFERENCE TO RELATED APPLICATION

This application claims the benefit of U.S. Provisional Application No. 60/548,255, which was filed on Feb. 27, 2004.

BACKGROUND

The present invention relates to data processing by digital computer, and more particularly to monitoring employment compensation.

To hire and retain employees, a company, organization, or enterprise monitors the current compensation rates used by smaller and larger companies along with companies of similar size. By monitoring employee compensation supported by the current marketplace, an employer can plan budgets and determine compensation adjustments for its current employees and set potential salaries for new employees. Also, by monitoring the current compensation levels supported by the market, compensation changes can be proposed to company officials in management positions. Furthermore, by monitoring compensation, a company can track how compensation varies for particular employment positions as a function of geographic location, market sector, or other metric.

SUMMARY

In general, in one aspect, the invention features a method that includes (a) receiving compensation information of a particular employee of a first company from a first database, (b) receiving compensation information associated with a second company from a second database, the second company being different from the first company, and (c) presenting in a graphical user interface (GUI) a graphical representation comparing the compensation information of the particular employee of the first company and the compensation information associated with the second company.

Implementations of the invention may include one or more of the following features. The method may further include changing compensation information associated with the first company based on the comparison. The compensation information of the particular employee may include salary data of an employment position at the first company. The compensation information of the particular employee may include a pay band. The compensation information associated with the second company may include survey data. The graphical representation may include a bar chart. The method may further include storing the compensation information associated with the second company in a storage device. The method may further include storing the changed compensation information associated with the first company in a storage device. Changing the compensation information associated with the first company may include changing a graphical representation of the compensation information associated with the first company.

In general, in another aspect, the invention features a computer program product, tangibly embodied in an information carrier, the computer program product being operable to cause a machine to receive compensation information of a particular employee of a first company from a first database, receive compensation information associated with a second company from a second database, the second company being different from the first company, and present in a graphical user interface (GUI) a graphical representation comparing the compensation information of the particular employee of the first company and the compensation information associated with the second company.

Implementations of the invention may include one or more of the following features. The computer program product may be further operable to cause a machine to change compensation information associated with the first company based on the comparison. The compensation information of the particular employee may include salary data of an employment position at the first company. The compensation information of the particular employee may include a pay band. The compensation information associated with the second company may include survey data. The graphical representation may include a bar chart. The computer program product may be further operable to cause a machine to store the compensation information associated with the second company in a storage device. The computer program product may be further operable to cause a machine to store the changed compensation information associated with the first company in a storage device. Changing the compensation information associated with the first company may include changing a graphical representation of the compensation information associated with the first company.

In general, in another aspect, the invention features a system that includes a company including a computer system that receives compensation information of a particular employee of a first company from a first database. The computer system receives compensation information associated with a second company from a second database, the second company being different from the first company. The computer system presents a graphical user interface (GUI) that includes a graphical representation that compares the compensation information of the particular employee of the first company and the compensation information associated with the second company.

Implementations of the invention may include one or more of the following features. The computer system may change compensation information associated with the first company based on the comparison. The compensation information of the particular employee may include salary data of an employment position at the first company. The compensation information of the particular employee may include a pay band. The compensation information associated with the second company may include survey data. The graphical representation may include a bar chart. The computer system may store the compensation information associated with the second company in a storage device. The computer system may store the changed compensation information associated with the first company in a storage device. Changing the compensation information associated with the first company may include changing a graphical representation of the compensation information associated with the first company.

Other features and advantages of the invention will be apparent from the description and from the claims.

DESCRIPTION OF DRAWINGS

FIG. 3 is a graphical user interface (GUI) for presenting compensation information.

FIG. 6 is a GUI for presenting employment compensation comparisons.

FIG. 7 is a GUI for presenting compensation pay bands.

FIG. 8 is a GUI for presenting pay band comparisons.

FIG. 9 is a GUI for adjusting pay bands.

FIG. 20 shows a window for displaying comparison graphs.

DETAILED DESCRIPTION

Figure 1:
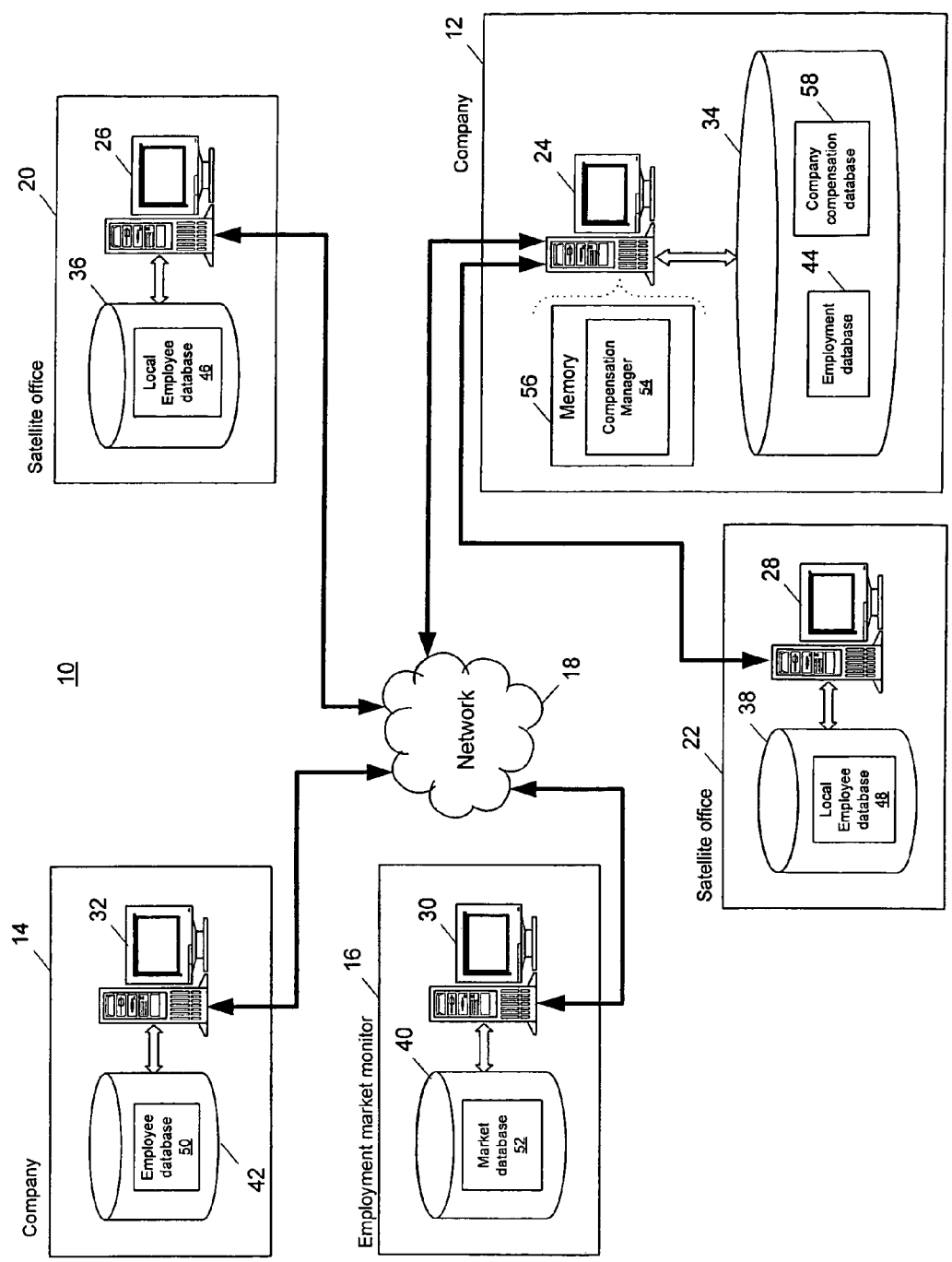
FIG. 1 is a block diagram depicting companies, satellite offices, an employment market monitor, and a network.

Referring to FIG. 1 a system 10 includes companies 12, 14 and an employment market monitor 16 (e.g., an employment market consulting house, an employment survey provider, etc.) that are in communication through a network 18 (e.g., the Internet, a wide area network (WAN), a local area network (LAN), etc.). A satellite office 20 of company 12 is also in communication with the network 18, while another satellite office 22 of company 12 is in direct communication with the company and does not send information through the network 18. Each of the companies 12, 14, and the satellite offices 20, 22, along with the employment market monitor 16 respectively include computer systems 24-32 that are in communication with separate storage devices 34-42 (e.g., hard drives, CD-ROMs, etc.). However, in some arrangements two or more of the computer systems share one or more of the storage devices. Furthermore in some arrangements, the system 10 is expanded to include more employment market monitors, companies, company satellite offices, and the like.

In this example, company 12 uses the computer system 24 to collect employment information (e.g., employee name, employment position, salary, benefits, etc.) associated with employment positions stationed at the location of the company 12. Collected employment information is entered into computer system 24 and stored in an employment database 44 in the storage device 34. Similarly, the computer systems 26 and 28 are used to collect employment information associated with employment positions located at the satellite offices 20, 22 and respectively enter the information in local employee databases 46, 48 stored in the respective storage devices 36, 38. Also, the employment information stored in the local employee databases 46, 48 is sent directly, or over the network 18, to company 12 for storage in the employee database 44 so that employee information collected from each location is stored at a central location.

Along with storing the employment information, the computer system 24 at company 12 is used to compare compensation information (e.g., salaries, bonuses, benefits, etc.) of individual employees with similar employment positions associated with other companies. To produce such comparisons, the computer system 24 collects compensation information from other companies or other information sources. For example, in system 10, company 12 collects compensation information associated with employment positions at the company 14 from computer system 32 through the network 18. Although, company 12 typically collects compensation information from more than one company to produce compensation comparisons. Along with collecting information from individual companies, such as company 14, the computer system 24 also collects compensation information from the computer system 30 located at the employment market monitor 16. In this example, the employment market monitor 16 stores a market database 52 that includes compensation information collected from numerous companies and enterprises that may or may not be in communication with the network 18. In some arrangements the compensation information stored in the market database 52 is collected by the employment market monitor 16 through data sources (e.g., brochures, websites, etc.) associated with companies or, for example, from responses to surveys sent the companies. By collecting and providing access to this survey data, the company 12 is capable of comparing the compensation of its employees to similar employment positions in other companies of similar size, producing similar products and services, etc.

Once calculated, the comparisons are provided to personnel (e.g., human resource managers, etc.) at company 12 in one or more graphical user interfaces (GUI) that are presented on computer 24 or other similar digital device (e.g., a laptop computer, a cellular telephone, a personal digital assistant (PDA), etc.). Typically the GUI used to present the compensation comparison includes graphical representations of the compensation information from the various sources (e.g., company 12, company 14, employment market monitor 16, etc.) so that a user can relatively quickly analyze the information. In some scenarios, based on the presented comparison data the user can determine if adjustments to the company 12, compensation should be proposed to governing officials of the company. Furthermore, the compared compensation information along with data associated with the graphical representations are stored in a company compensation database 58 in the storage device 34 so that the data can be retrieved for further analysis or to be used in other comparison studies.

To collect and compare compensation information from the company 12, the satellite offices 20, 22, the company 14, and the employment market monitor 16; a compensation manager 54 is executed on the computer system 24. In this example, the compensation manager 54 is stored and executed in memory 56 (e.g., random access memory (RAM), static (SRAM), dynamic RAM (DRAM), read-only-memory (ROM), etc.) included in computer system 24. However, in some arrangements the compensation manager 54 is stored in a storage device (e.g., a hard-drive, CD-ROM, etc.) such as the storage device 34. Also, in some arrangements, company 14 accesses company 12 through the network 18 to execute the compensation manager 54. By remotely using the compensation manager 54, company 14 can compare its employment positions to employment positions at company 12 along with employment positions stored in the market database 52.

Figure 2:
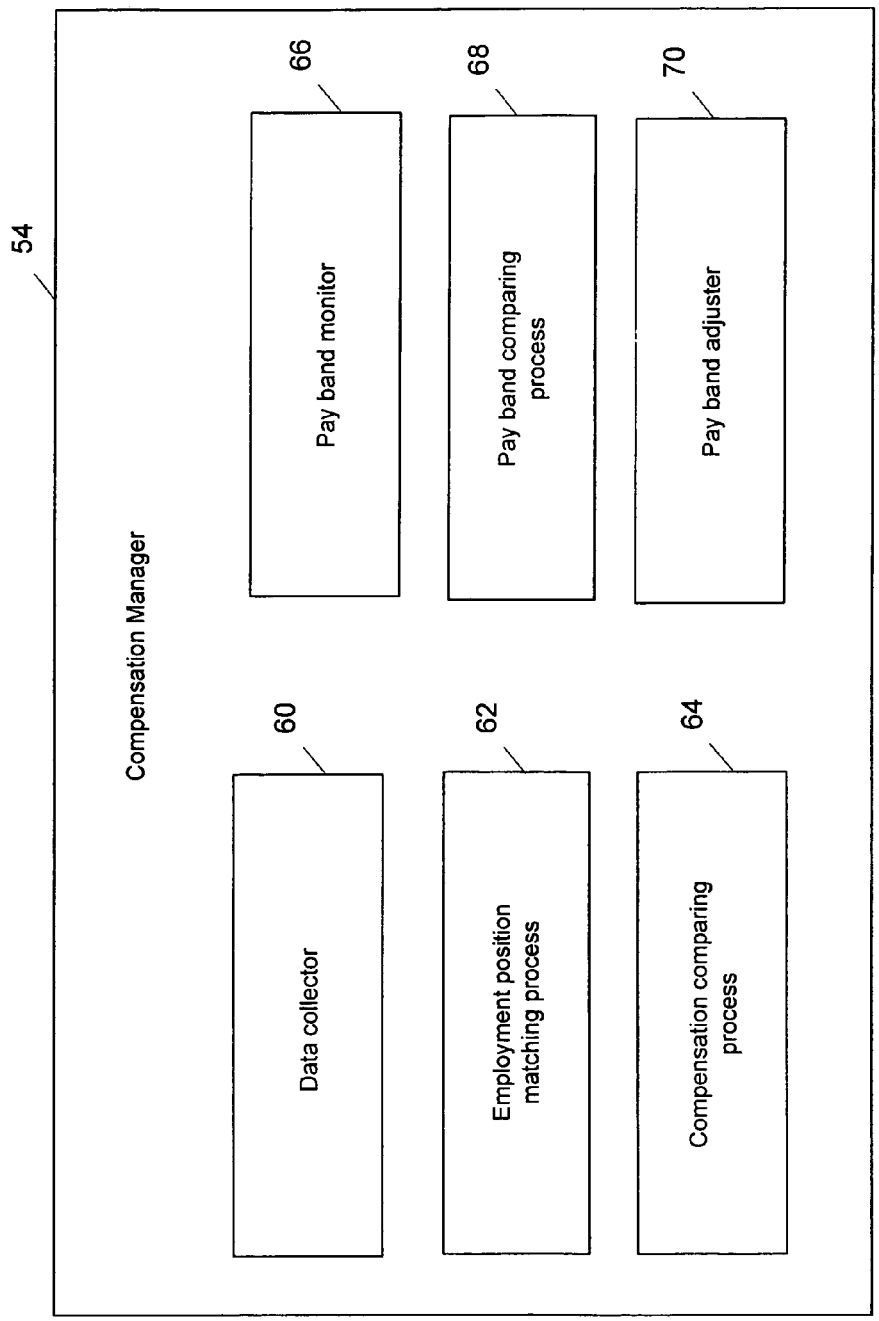
FIG. 2 is a block diagram depicting a compensation manager.

Referring to FIG. 2, the compensation manager 54 executed by computer system 24 includes processes that perform operations associated with comparing compensation information from external sources (e.g., company 14, employment market monitor 16, etc.) and internal sources (e.g., company 12, satellite offices 20, 22, etc.). For example, the compensation manager 54 includes a data collector 60 for accessing and retrieving compensation information from the external and internal information sources. In this arrangement, the data collector 60 accesses the market database 52 at the employment market monitor 16 and retrieves compensation data complied by the market monitor, for example, from collected survey responses. The compensation manager 54 also includes an employment position matching process 62 that is used to match employment positions to compare compensation levels. For example, to compare compensation between employment positions at company 12 and positions at company 14, the employment position matching process 62 matches similar employment positions at the two companies. In another example, the employment position matching process 62 matches positions at company 12 with employment positions compiled in survey data provided by the employment market monitor 16.

The compensation manager 54 also includes a compensation comparing process 64 that compares the compensation information (e.g., salary, bonuses, benefits, etc.) associated with two or more matched employment positions and presents the comparison to a user (e.g., human resource personal) on computer system 24. For example, the compensation comparing process 64 uses compensation information collected from company 12 and company 14 to graphically present a comparison of two or more similar employment positions at the two companies. In another example, the compensation comparing process 64 uses survey data collected from the employment market monitor 16 and compensation data from company 12, along with data from the satellite offices 20, 22, to compare the compensation of two or more employment positions at company 12 with the compensation of similar positions sampled across the entire employment market or a subset of similar positions from a particular portion of the employment market (e.g., companies in a similar geographic location, companies of a similar size, etc.).

The compensation manager 54 also includes a pay band monitor 66 that graphically presents the discrete pay bands used by company 12 and the satellite offices 20, 22. In general, pay bands are used to separate a company's compensation continuum into discrete pay levels to which various employment positions can be assigned. For example, manufacturing employment positions in company 12 are assigned to one pay band (e.g., pay band 1) while manufacturing management positions are assigned to another pay band (e.g., pay band 3). Furthermore, each particular pay band may be separated into a finite number of pay steps to further distinguish the compensation of particular employment positions. Along with providing a process for presenting pay bands to the user, the compensation manager 54 also includes a pay band comparing process 68 that is used for comparing the pay bands used by company 12 with pay bands used other companies such as company 14 or with generalized industry pay bands that are complied by the employment market monitor 16. In some arrangements, after a user (e.g., human resource personnel) is presented a pay band comparison, the user may decide to propose changes to the current pay bands used by company 12. For example, based on the presented comparison, the user may determine the market is more closely tracked by shifting one or more of the company 12 pay bands upward or downward. However, by changing the pay bands, other operations (e.g., project budgeting, projected hiring, etc.) associated with company 12 are affected and should be taken into account. To account for potential problems due to adjusting the pay bands, the compensation manager 54 includes a pay band adjuster 70 that allows the user to adjust current pay bands for modeling and analysis prior to proposing a change to any company officials. If the analysis reveals the pay band changes to be favorable to company 12, the adjustments can be entered into a proposal. However, if the analysis shows the pay band adjustments are not favorable and a proposal is not warranted, the adjustments can be disregarded. But, favorable or not, data representing the adjustments can be stored in the company compensation database 58 by the pay band adjuster 70 for future analysis efforts.

In some arrangements the processes included in the compensation manager 54 are implemented to use one or more GUIs that have similar graphical structures (e.g., windows, menus, selection icons, etc.) so that each GUI presents a similar "look and feel" to the user. For example, by using a common menu on each GUI, a user can become familiar with the functionality provided by each menu option and is less likely to be confused or distracted as he or she selects to view the different GUIs for viewing data and performing operations associated with the processes included in the compensation manger 54. Furthermore, by associating different GUIs with the different processes in the compensation manager 54, the user does not have to view each GUI to perform a particular operation. For example, if the data collector 60 has previously been used to retrieve and store compensation information for a particular analysis; at a later time, the user does not need to view the GUI associated with the data collector and can initially select to view the GUI associated with the compensation comparing process to begin an analysis.

Figure 3:
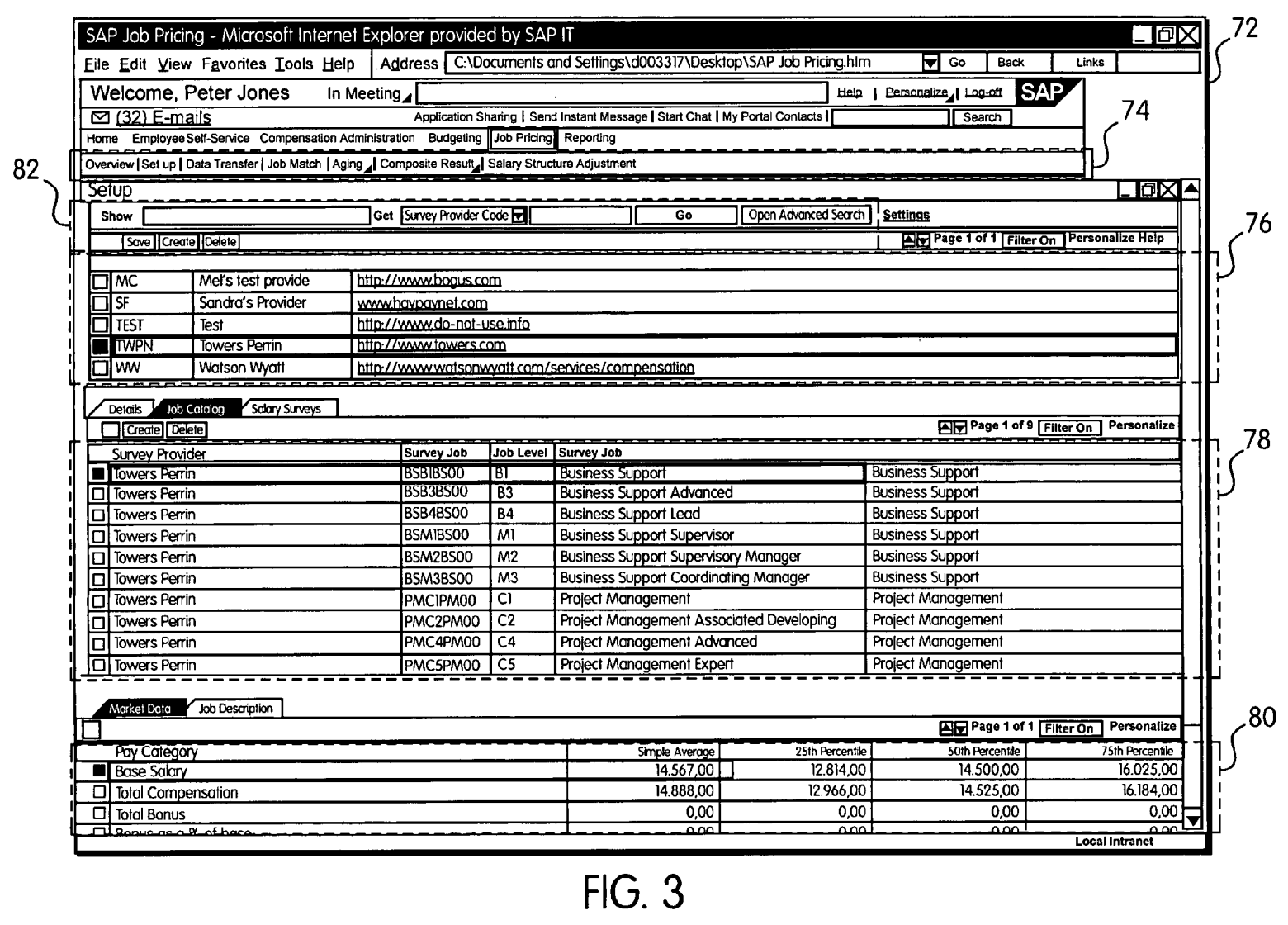

Referring to FIG. 3, an exemplary GUI 72 includes a menu highlighted by dashed-box 74 that allows a user to select menu options associated with operations performed by the compensation manager 54. The GUI 72 includes data fields and selection boxes for selecting survey data from one or more sources such as employment market monitor 16. In this example, to select survey data the user selects one or more survey providers from a list included in dashed-box 76 that also includes an Internet link (e.g., URL address) of each provider. Here, one survey provider (e.g., Towers Perrin) has been selected by the user and a list of job catalogs associated with the provider are presented in dashed-box 78 and are used by the data collector 60 to retrieve compensation information associated with particular types of employment positions. In this example, as shown in dashed-box 78, the user has selected one job catalog (e.g., business support) that includes compensation data, as shown in dashed-box 80, which is used by the compensation manager 54 for comparing with compensation information of one or more employment positions at company 12. By allowing the user to select from a variety of survey providers and corresponding survey data, analysis can be performed by using subsets of the survey data. For example, survey providers that collect survey data from companies located in particular geographic regions may be selected for a regional analysis if company 12 is located in the same region. In another example, survey data may be selected that is collected from companies that have a similar size or market share as company 12.

The GUI 72 also includes a menu in dashed-box 82 that allows the user to produce custom groups of survey providers. For example, the user can produce a group that includes survey providers that collect compensation information from companies in the San Francisco area or companies in the telecommunication industry. After a group of survey providers is produced, the group is typically stored by the data collector 60 on a storage device, such as storage device 34 so that the group can be retrieved at later time for another compensation analysis. By allowing the user to produce groups of survey providers, hierarchical group structures (e.g., directories) can be produced for reducing the time needed to setup and perform a compensation analysis.

Figure 4:
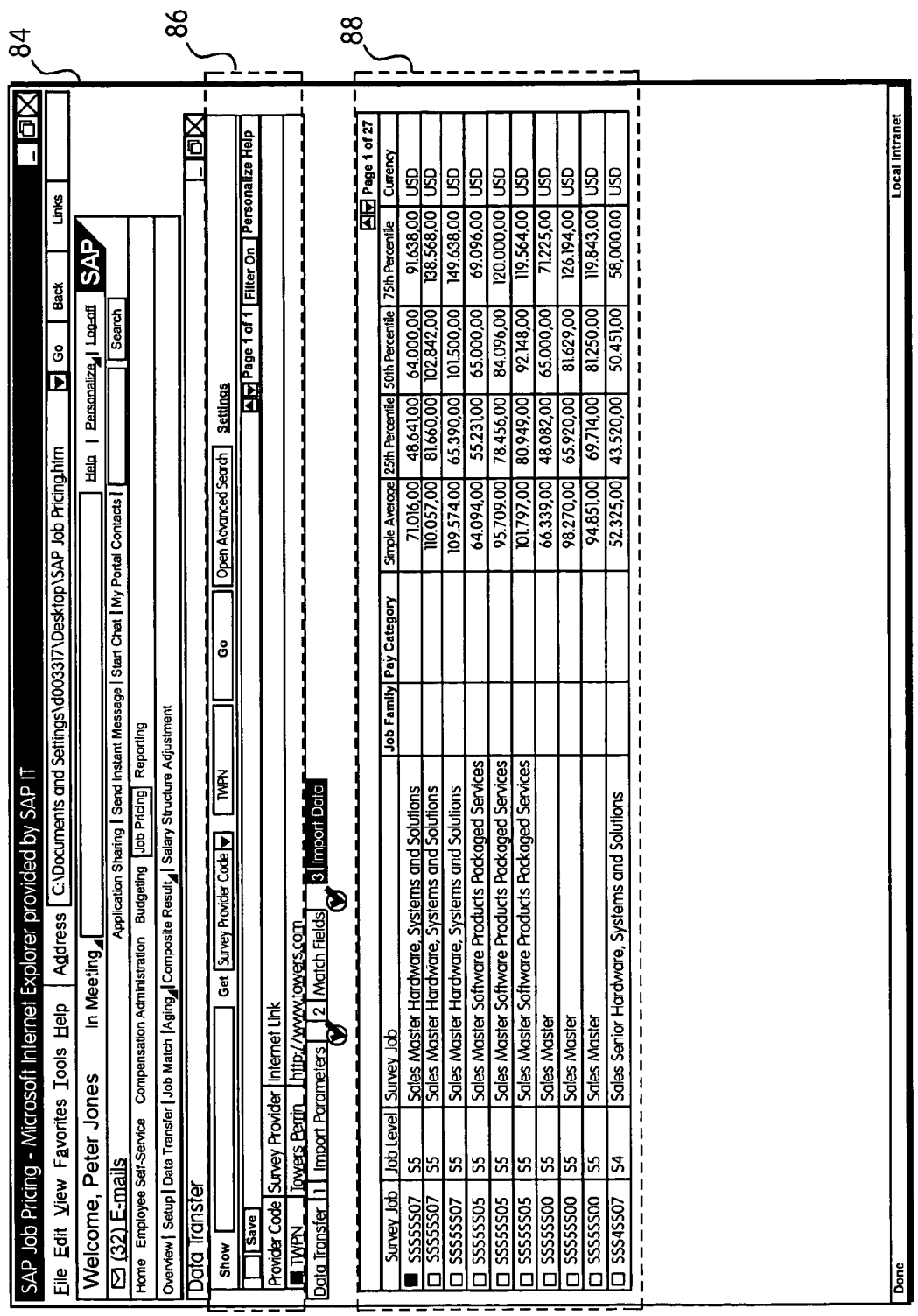
FIG. 4 is a GUI for collecting compensation information.

Referring to FIG. 4, typically after the user has selected which job catalog or catalogs are to be used for the comparison analysis, a data transfer GUI 84 is used in conjunction with the data collector 60 to retrieve the compensation information in the selected catalog(s). Although, in some scenarios the user has decided which survey data to use and does not need to view the survey providers listed in GUI 72 and a menu highlighted by dashed-box 86 is used to select a predetermined job catalog. Alternatively, in some arrangements, if GUI 72 was used to select a particular job catalog, data associated with the selected job catalog is passed to the menu in dashed-box 86 so the user does not need to enter it. In this example, one survey provider (e.g., Towers Perrin) has been selected to provide survey information, however, in other arrangements two or more survey providers are selected.

The data transfer GUI 84 also includes a list 88 of jobs that are included in the selected job catalog. By selecting one or more of the jobs in the list 88, compensation information associated with the job or jobs is elected by the user for transfer. In this example, the first entry (e.g., Sales Master hardware, systems, and solutions) in the list 88 has been selected by the user so that associated compensation information is transferred from the survey provider to the compensation manager 54 for analysis. In other examples, two or more list entries are selected for transferring associated compensation information. Also, as the compensation information is transferred, the data collector 60 stores the information in the storage device 34 so that the information can be retrieved at later times for further analysis.

Figure 5:
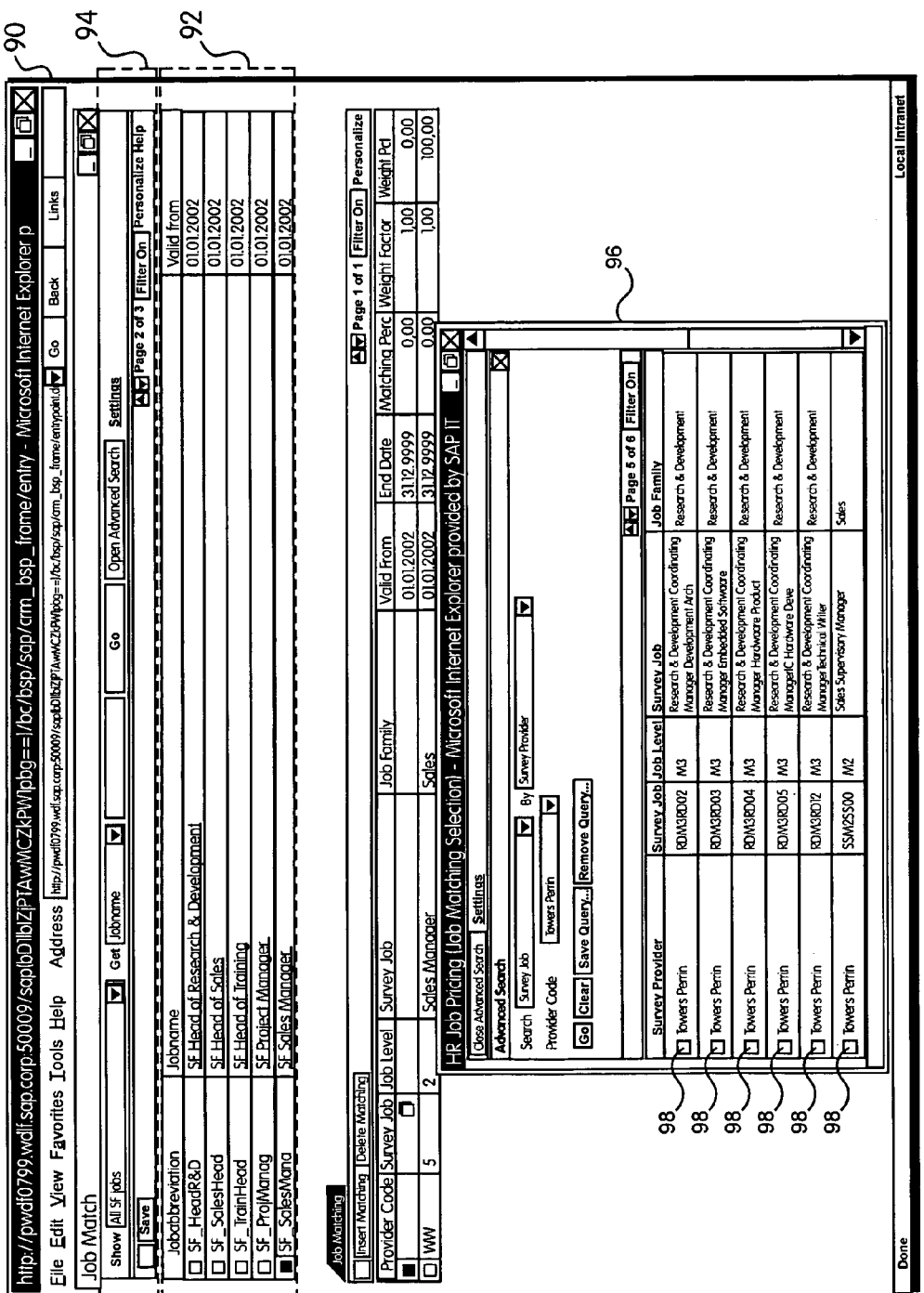
FIG. 5 is a GUI for matching employment positions.

Referring to FIG. 5, after compensation information has been transferred from survey providers such as employment market monitor 16, or other companies such as company 14, the employment position matching process 62 is used to match employment positions included in the transferred data with employment positions of company 12 that are identified in the employment database 44. To match the employment positions, the employment position matching process 62 uses a job matching GUI 90 for matching internal (i.e., employment positions at company 12) and external (e.g., survey employment positions) employment positions. To match employment positions, the GUI 90 includes a list 92 of some of the employment positions at company 12 and the satellite offices 20, 22. In this arrangement, to present the list 92, the GUI 90 also includes a menu in dashed-box 94 for selecting the particular type of company 12 employment positions that are stored in the employment database 44. Similar to the GUIs 72 and 84, the menu in dashed-box 94 includes data fields for searching and selecting sets and subsets of employment positions. By providing a similar "look and feel" to each similar menu included in the GUIs, the user can relatively quickly navigate through the potential choices of employment positions for comparing compensation. In this particular example, the menu in dashed-box 94 is used to retrieve company 12 employment positions that are located in the San Francisco area. Once retrieved, the employment positions are presented in list 92 for matching with positions included in the retrieved survey data. Here, the user has selected the "SF Sales Manager" position of company 12 for matching. To match this internal employment position to one or more external employment positions, a GUI 96 is presented that includes a list of the employment positions collected from the survey provider (e.g., Towers Perrin) that was identified in GUI 84 for collecting employment compensation information. By selecting one or more of the indicators 98 associated with the respective employment positions, the user matches the selected survey employment positions to the company 12 employment position selected from the list 94.

Figure 6:
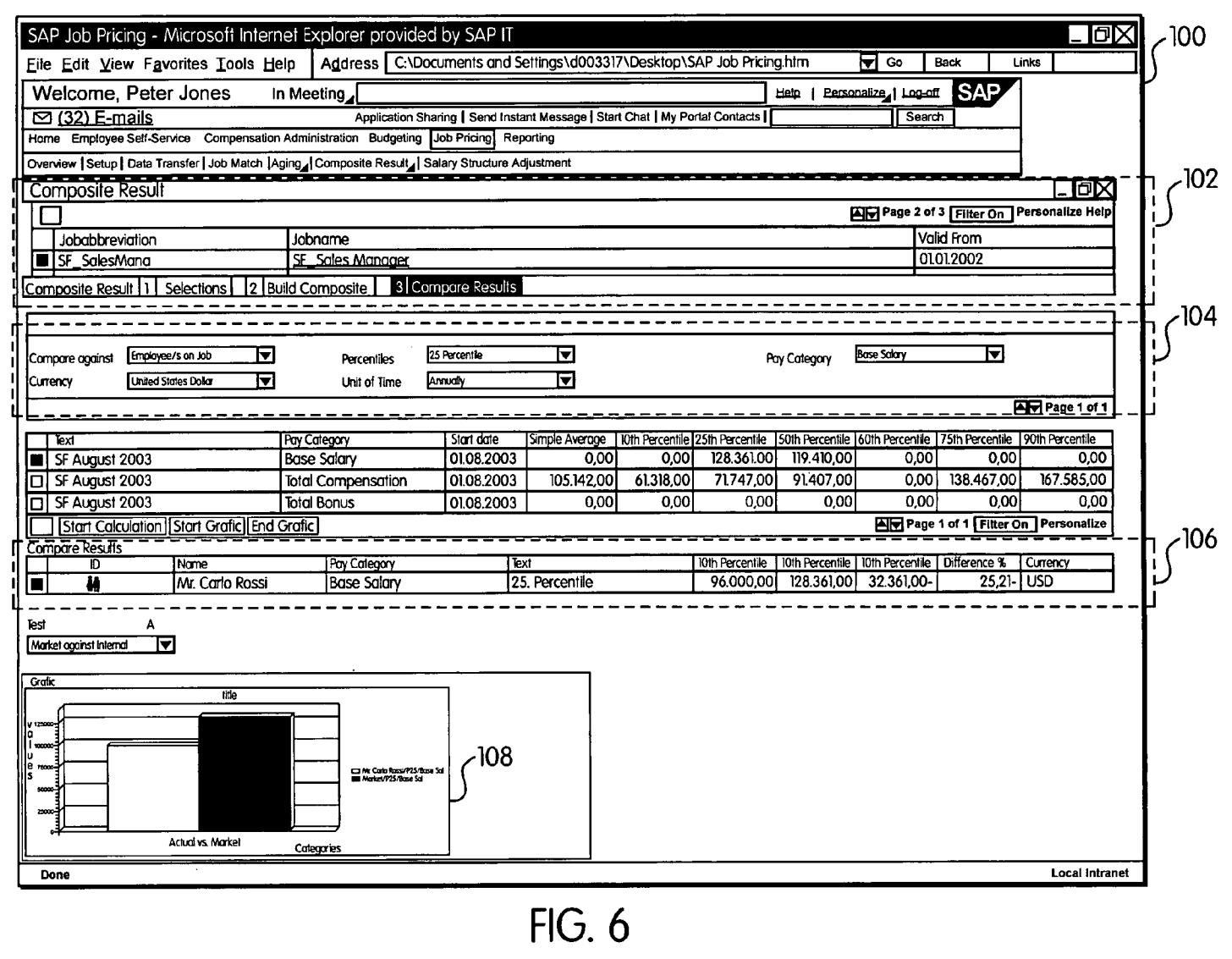

Referring to FIG. 6, a GUI 100 is presented by the compensation manager 54 to provide comparisons of the compensation information associated with company 12 employment positions and employment positions selected from the collected survey data. In this example, a portion of GUI 100 includes a list in dashed-box 102 that identifies the company employment positions that have been selected for comparison. Here, sales manager positions located in San Francisco (i.e., SF_Sales_Manager) have been selected for the comparison, although other employment positions can be used for compensation comparisons. A portion 104 of GUI 100 also includes user-selectable parameters that are used by the compensation comparing process 64 for comparing compensation. For example, one of the user-selectable parameters is set so that comparisons are performed on the annual base salaries associated with the employment positions. Also parameters are selected to evaluate with U.S. dollars and to use the $25^{th}$ percentile of the base salaries. In some arrangements other parameter selections are used to produce comparisons. For example, instead of basing the comparison on filled positions, positions not currently held can be used in comparisons. Also other currencies (e.g., yens, marks, etc.) are used in some comparisons and besides annual salaries of an employee, other pay periods (e.g., 6 months, 5 years, etc.) are used. Furthermore, besides base salaries, other types of compensation such as bonuses, benefits, etc. are used in the comparisons.

Based on the parameter selections, the compensation comparing process 64 accesses the collected survey data and the employee database 44 and retrieves the appropriate compensation data to compare the selected positions identified in dashed-box 102. After retrieving the data, the compensation comparing process 64 presents a list in dashed-box 106 that identifies the particular company 12 employees that meet the selected parameters. In this example, one employee (e.g., Mr. Carlo Rossi) of company 12 is identified as matching one or more of the positions from the selected survey data based on the selected parameters. In particular, the comparison shows that the company 12 employee has a base pay of $96,000.00 US while the $25^{th}$ percentile base salaries provided by survey data is $128,000.00 US for a similar position.

The GUI 100 also includes a graphical chart 108 that presents the comparison data. In this example the graphical chart 108 is a bar chart that includes a bar representing the base salary of employee Rossi and another bar that represents the $25^{th}$ percentile base salary of similar positions as provided by the survey data. By providing the graphical chart 108, the user can relatively quickly determine how the compensation of company 12 compares to the market data without needing to study the numerical values of the compensation. In this example, a bar chart was used to present the comparison data to the user, however, in other arrangements, other types of graphical representations (e.g., x-y chart, pie charts, etc.) are use in GUI 100 to present the comparison. Also, in some arrangements, other graphical features (e.g., error bars, curve fits, etc.) are incorporated into the graphical representation to assist the user in analyzing the comparison data.

In this example, the compensation information provided by the survey data is compared to the compensation information associated with a single employee of the company 12. However, in other comparisons, the survey data is compared to one or more employment positions at company 12. For example, the compensation manager 54 can be used to compare base salaries of software programmers employed at company 12 to base salaries of software programmers in the same geographic region, or employed by a company of similar size, or other type of company or employment characteristic. Also, instead of comparing positions at company 12 with the survey data, the compensation manager 54 can compare compensation provided by company 12 with compensation provided by other individual companies. For example, the compensation manager 54 can use information retrieved from company 14 for comparing with the compensation provided by company 12. Also, in other examples, a combination of compensation information from individual companies (e.g., company 14) and market survey data is compared to the compensation provided by company 12.

FIG. 20 shows another example of a GUI 300 that may be presented by compensation manager 54. GUI 300 contains tabs 301, 302 and 304. Tab 301 displays a screen (not shown) that presents the current salary structure of company 12. The current salary structure lists, e.g., the current pay grades of company 12, who falls within those pay grades, and salary ranges within those pay grades. Tab 302 displays a screen (not shown) that presents market data relating to salary structures of other companies. These salary structures are, generally speaking, for companies in the same business as company 12 and for employees having generally the same task assignments as those of company 12.

Figure 21:
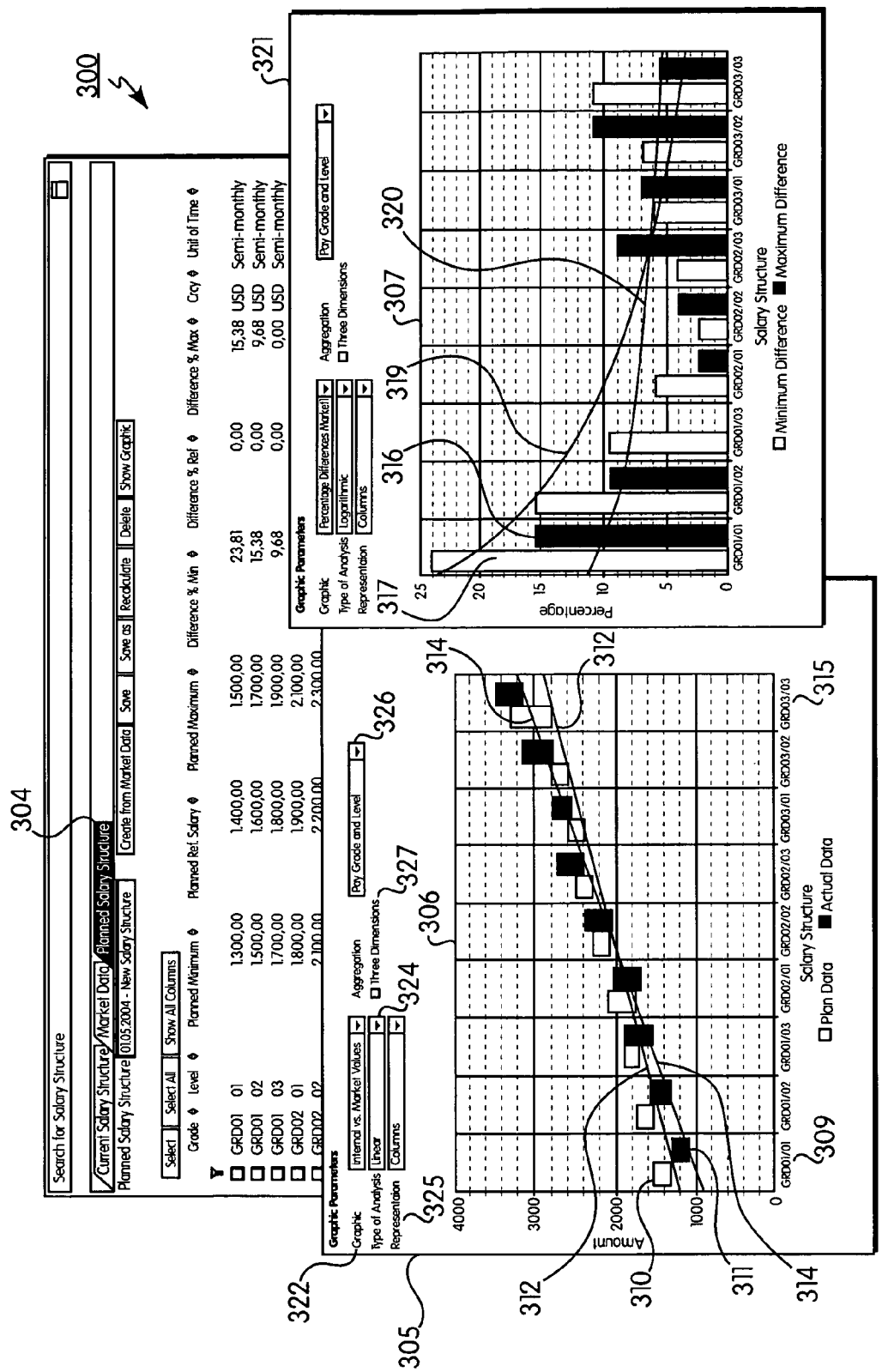
FIG. 21 shows graphs comparing company and market salary structures.

Tab 304 displays a window, such as window 305 (FIG. 21). Window 305 is capable of displaying one or more graphs, such as graphs 306 and 307. These graphs provide various comparisons of data associated with company 12 to market data. For example, graph 306 provides a comparison of the salary structure of company 12 (referred to as "plan data") to market data (referred to as "actual data"). The Y-axis of graph 306 contains a pay amount, e.g., in US dollars. The X-axis of graph 306 contains the pay grades. For each pay grade, such as pay grade 309, graph 306 provides the salary range 310 of company 12 and the market salary range 311 (e.g., the average salary range provided by other companies). In this embodiment, the ranges are provided as "bars" for each salary grade.

Graph 306 also contains curves 312 and 314. In this embodiment, these curves are linear regressions that represent salary amounts (e.g., averages) take over the entirety of graph 306. Curve 312 represents the salary amount of company 12; and curve 314 represents the salary amount of the market. By comparing curves 312 and 314, it is possible to determine where company 12 falls short of, exceeds, or is about equal to market salaries. For example, in pay grade 315, company 12 falls short of the market salary (as evidenced by curve 314 exceeding curve 312). By contrast, in pay grade 309, company 12 exceeds the market salary (as evidenced by curve 312 exceeding curve 309).

Graph 307 shows a different graphical comparison of company 12's salary structure and the market's salary structure. In graph 307, the X-axis again represents pay grades. The Y-axis, however, represents, for each pay grade, the percentage difference between the maximum pay provided by company 12 and the maximum pay provided by the market (e.g., 316), and the percentage difference between the minimum pay provided by company 12 and the minimum pay provided by the market (e.g., 317). In this embodiment, curves 319 and 320 are logarithmic regressions indicating the relationship, over the pay grades, between the maximum and minimum differences in pay.

Windows 305 and 321 may be displayed separately or at the same time (as is the case in FIG. 21). As shown in FIG. 21, windows 305 and 321 contain pull-down menus, which allow a user to select how to display data. "Graphic" menu 322 allows the user to select the type of graphic (e.g., "Internal vs. Market Values" in graph 306). "Type of Analysis" menu 324 allows the user to select the analysis to be performed on the data (e.g., "Linear" regression in graph 306). "Representation" menu 325 allows the user to select how data in the various pay grades is to be represented (e.g., "Columns" in graph 306). "Aggregation" menu 326 allows the user to select what is displayed on the X-axis (e.g., "Pay Grade and Level" in graph 306). Check box 327 provides for graphing of relevant data in three dimensions.

Figure 7:
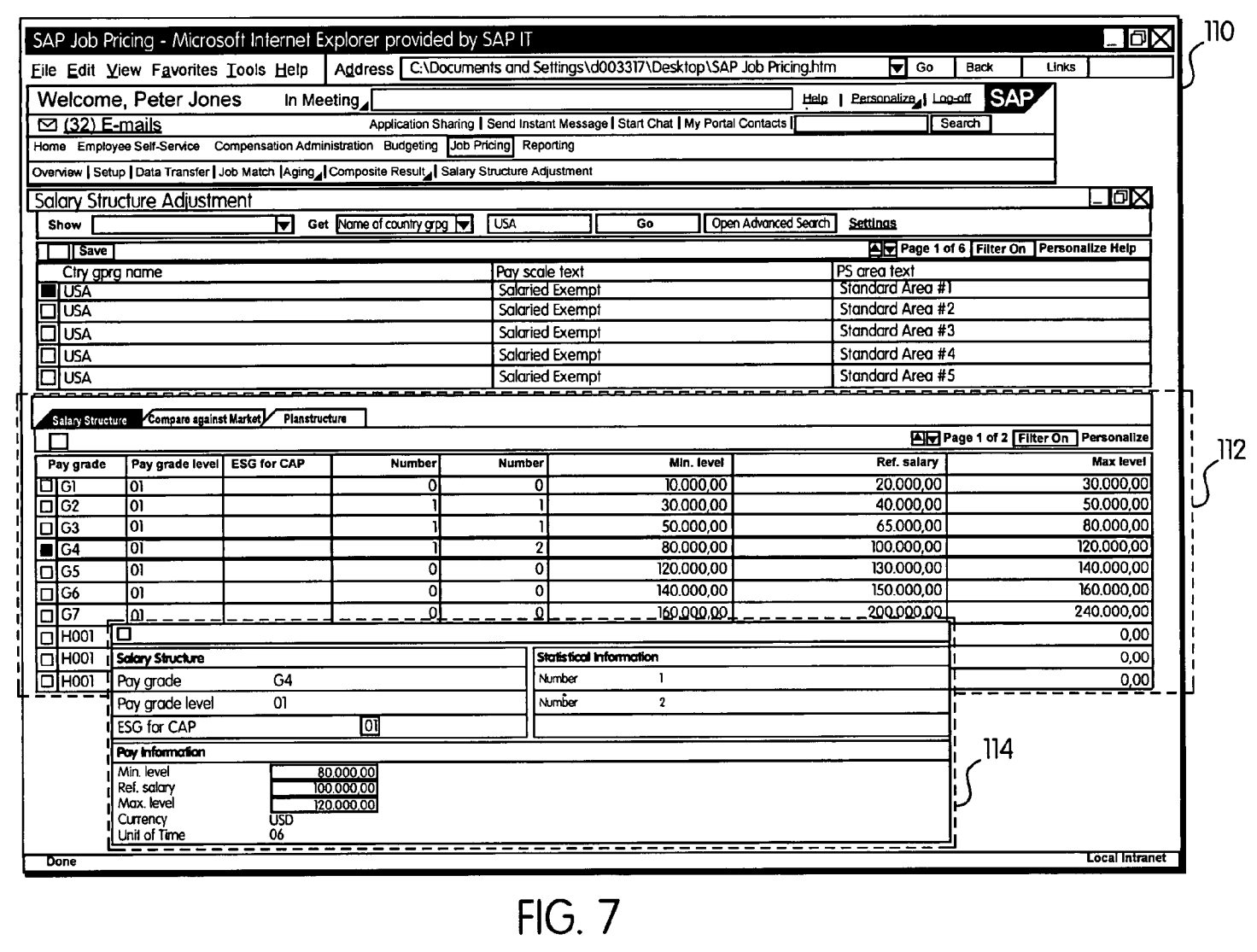

Referring to FIG. 7, based on comparing compensation between company 12 and the survey data provided by the employment market monitor 16, or between company 12 and another company (e.g., company 14), in some scenarios, the user of the compensation manager 54 decides to propose adjustments to compensation provided by company 12. In some arrangements, the amounts of compensation provided by company 12 are separated across pay bands. By subscribing to a pay band system, company 12 can assign each employment position to a particular pay band. For example, a software programmer position may be assigned to particular pay band (e.g., band G4) while a software project manager position is assigned to a pay band (e.g., band G7) that is associated with a larger salary. Also, in some arrangements more than one pay band system is used by a company. For example, company 12 may use one group of pay bands (e.g., bands G1-G7) for wage employment positions (e.g., carpenters, electricians, plumbers, etc.) and another group of pay bands (e.g., GM1-GM7) for salary employment positions. Furthermore, each pay band may include a number of steps to further separate compensation levels assigned to a pay band. For example, one particular pay band step (e.g., pay band G1 step 1) is assigned to the lower range (e.g., $50,001-$70,000) of the pay band while a second step (e.g., pay band G1 level 2) is assigned to the upper range (e.g., $70,001-$90,000) of the pay band.

To view the pay bands used by company 12, the pay band monitor 66 included in the compensation manager 54 presents a pay band GUI 110 that includes a list 112 of the pay bands. In this example, the pay bands include a low pay band G1 that is assigned to salaries with a minimum level of $10,000.00 and an upper level of $20,000.00. From the low pay band G1, the pay bands progress to the upper pay band G7 that is assigned to a salaries ranging for $160,000.00 to $240,000.00. Also, in this example, each pay band includes one step, however as mention, one or more of the pay bands can include multiple steps that further distribute the salaries.

In GUI 110, if the user selects a particular pay band (e.g., pay band G4), a list 114 is presented that includes information associated with the pay band. For example, the list 114 includes salary range endpoints along with data fields for presenting statistical information (e.g., mean pay, pay variance, standard deviation, etc.) and the units (e.g., US dollars) of the displayed currency amounts. While GUI 110 presents data associated with the pay bands used by company 12, the pay band monitor 66 is also capable of presenting pay bands from the collected survey data and pay bands used by other individual companies (e.g., company 14) for comparing with the pay bands used by company 12.

Figure 8:
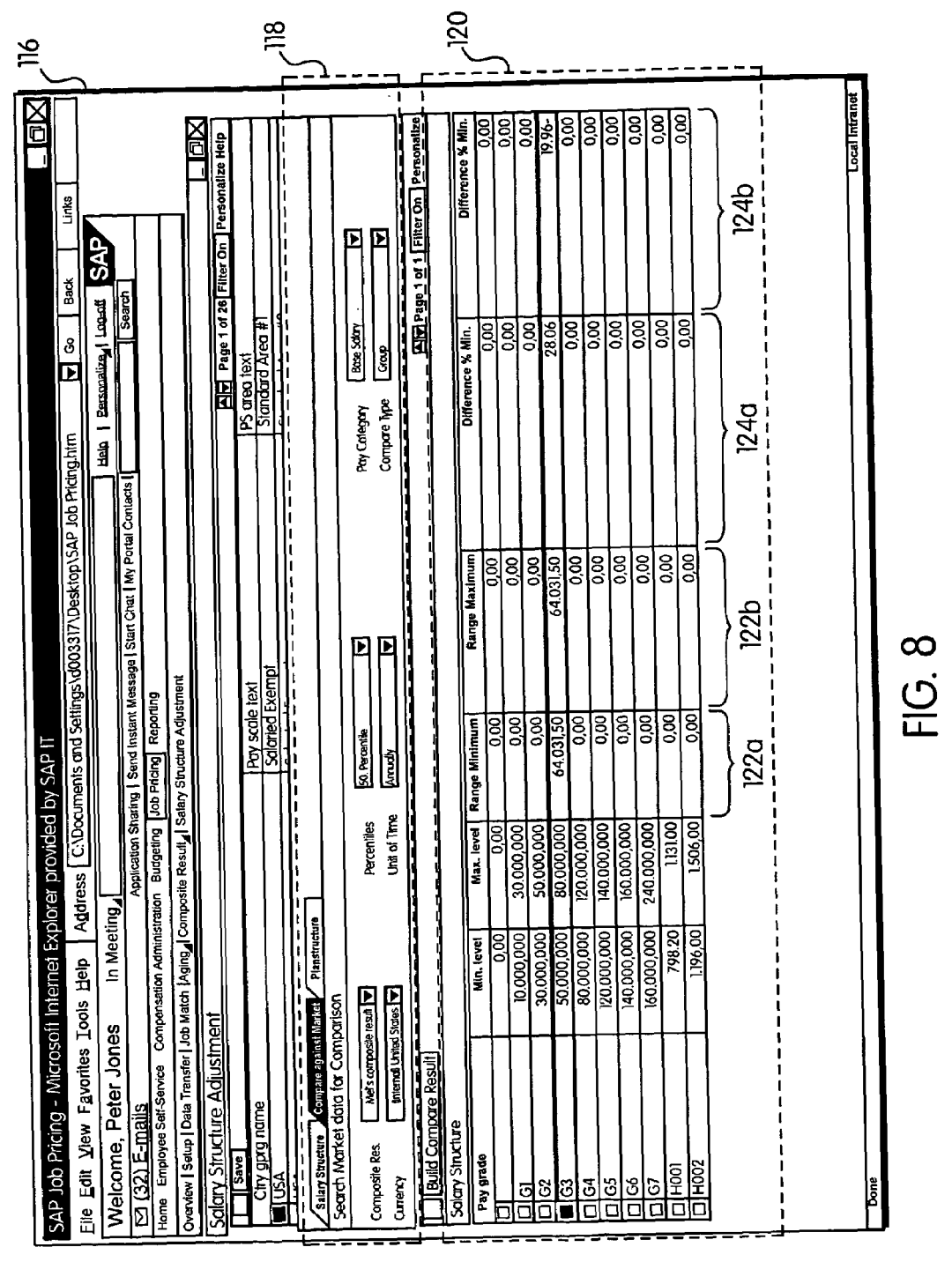

Referring to FIG. 8, when the user selects a tab labeled "Compare against Market", the pay band monitor 66 presents a GUI 116 that includes pay band information associated with company 12 and, in this example, associated with the survey data collected from the employment market monitor 16. To determine which survey data to present in comparison to the company 12 pay grades, the GUI 116 includes a group of selectable parameters in dashed-box 118 for selecting a portion of survey data of interest. In this example, the selectable parameters in dashed-box 118 are used to select a portion of the survey data along with the currency units and the type of compensation (e.g., base salary, bonuses, total salary, benefits, etc.). The selectable parameters are also used to select a percentile (e.g., 50 percentile) of the compensation for the comparison along with a compensation time period (e.g., annual salary) to further define the portion of the survey data to be compared to the pay bands used by company 12.

After the parameters are selected in dashed-box 118, the selections are passed to the pay band comparing process 68 that retrieves the appropriate data from the collected survey data and presents a list shown in dashed-box 120 that identifies the pay bands (e.g., G1-G7) used by company 12 along with minimum and maximum salary levels respectively assigned to each pay band. The list in dashed-box 120 also includes the two columns 122a, 122b that present the salary ranges for similar pay bands reflected by the employment market as provided by the survey data. The list also includes two columns 124a, 124b that respectively present the percent difference between each company 12 pay band minimum and maximum value and the corresponding pay band minimum and maximum value provided by the survey data. In this particular example, the survey data presented in the columns 122a, 122b include a single data point that corresponds to pay band G3 of company 12. Since there is a single data point, one value (e.g., $64,031.50) is included as the minimum and maximum values. Correspondingly only one value is included in column 124a (e.g., 28.06%) to report the difference between the survey data and the lower range of pay band 3 used by company 12 and the difference in relation to the upper range of pay band 3 presented in column 122b (e.g., −19.96%).

By comparing the current pay bands used by company 12 and the pay bands provided by the survey data, the user can study any compensation differences and determine whether or not to propose a change in the company 12 pay bands to better track the current employment market data. For example, if the survey data indicates that one of the company 12 pay bands is below the survey data, the user may decide to propose that company 12 shift the pay band to increase the minimum and maximum salary values. Alternatively, if the comparison reveals that one or more of the company 12 pay bands are above the representative employment market pay bands, the user may decide to propose that the company 12 pay bands be shifted down to better reflect of the current employment market.

Figure 9:
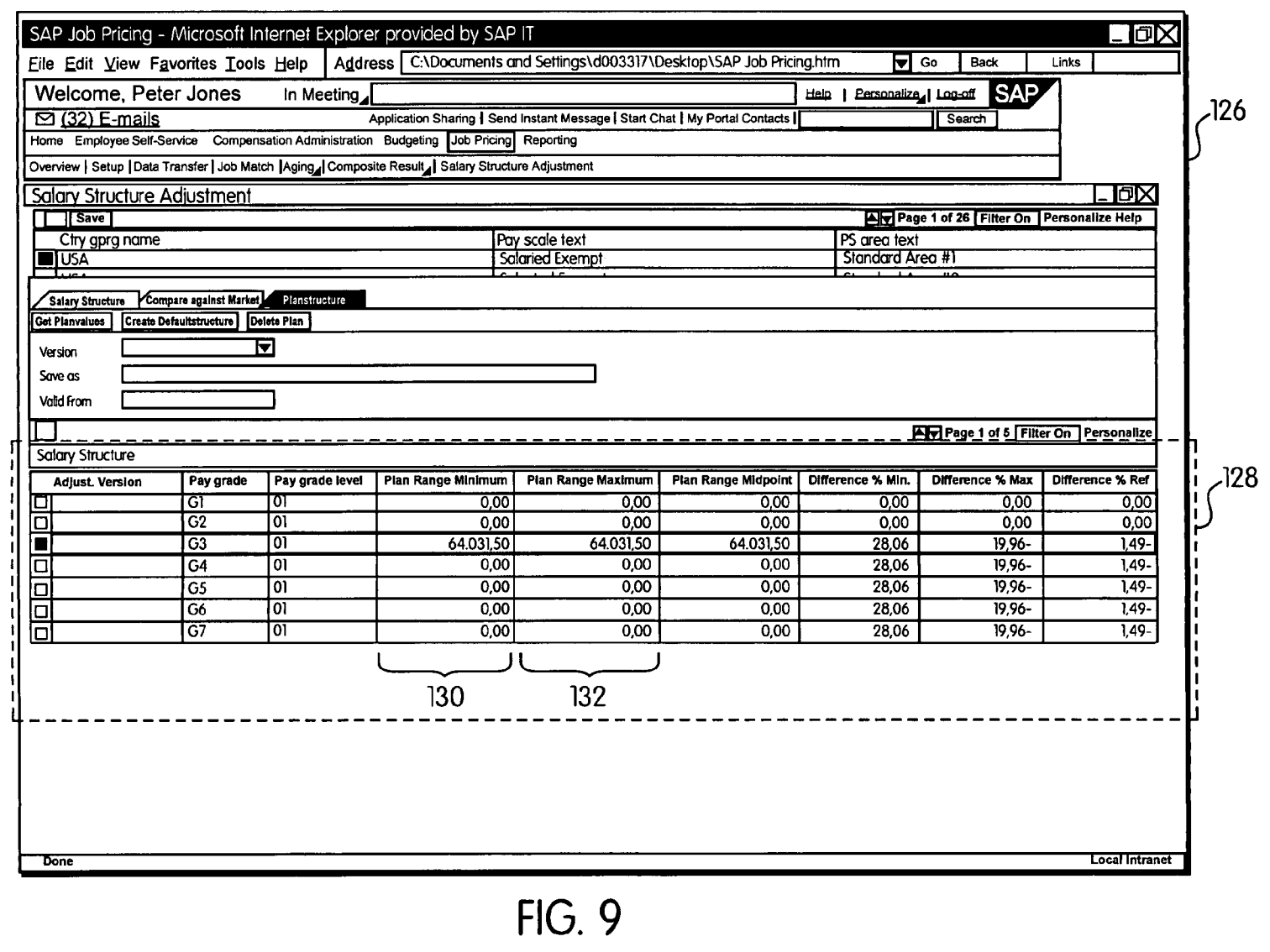

Referring to FIG. 9, if the user decides to propose a change to one or more of the pay bands used by company 12, the user selects a tab (e.g., "Plan structure") included in GUI 126. When selected, the pay band adjuster 70 presents a list, highlighted by dashed-box 128, of the company 12 pay bands (e.g., G1-G7) along with respective columns 130, 132 for entering adjusted minimum and maximum compensation values. For example, one or more pay bands are adjusted to reflect increased or decreased salary ranges. In other arrangements, bonuses, benefits, or other types of compensation are adjusted in one or more of the pay bands.

In this example, the survey data, which was presented in GUI 116 is passed to GUI 126 so that the user, if interested, can relatively quickly match the company 12 pay bands to the pay bands provided by the survey data. Again, since only a single data point was provided by the survey data for the parameter selections made by the user, the data point value (e.g., $64,031.50) is entered in the column 130 for planned range maximum and in the column 132 for planned range minimum in pay band G3. The other entries included in the two columns, which present a zero value, can also be adjusted to enter proposed changes to the other pay bands (e.g., pay bands G1, G2, G4-G7).

After the user has entered adjustments for one or more of the pay bands, data representing the adjustments is typically stored in a file on the storage device 34 for retrieving at a later time to further adjust the pay bands. In some arrangements, along with storing the data in a file, the pay band adjuster 70 enters the pay band adjustments into a proposal document that is also stored in the storage device 34. Also, once the adjustments to the pay bands are entered into the columns 130, 132, the data can be transferred to other portions of the compensation manager 54, or other processes, routines, or functions. For example, the proposed adjustments are transferred to a job budgeter (not shown) that is used to budget bid prices of potential contracts or other tasks. By providing the proposed pay band adjustments to the job budgeter, the user can determine if the proposed adjustments are too large for bidding particular jobs even though the adjustments were chosen to match the survey data.

Instead of the user entering numerical values into the columns 130, 132 to adjust the upper and lower limits of respective pay bands, in some arrangements, one or more interactive graphical bars are used to represent each pay band so that a pointing device (e.g., mouse) can be used to graphically adjust one or more of the pay bands. In other arrangements, other types of interactive graphical representations are used to enter pay band adjustments. For example, pie charts with user-interactive pie slices are used to adjust a pay band upper and lower limit. Furthermore, in some arrangements the interactive graphical representations are in communication with other processes that may influence potential adjustments. For example, after the job budgeter process (not shown) receives potential pay band adjustments from the compensation manager 54, the job budgeter process may determine that the proposed adjustments are too large for bidding an upcoming job and accordingly send data to re-adjust the interactive pay band graphical representations to present the appropriate pay bands needed to meet a bid price.

Figure 10:
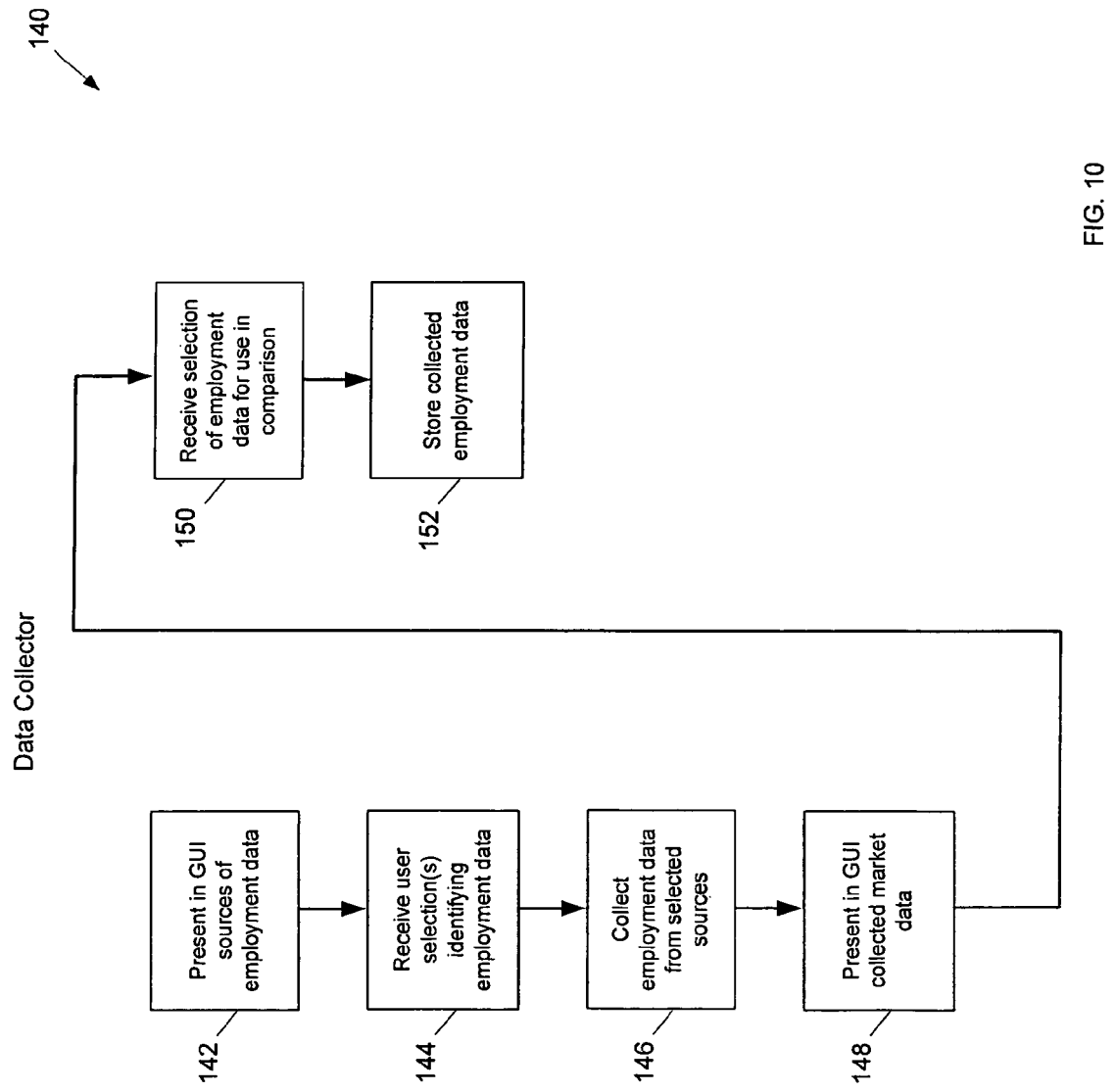
FIG. 10 is a flow chart of a data collector.

Referring to FIG. 10, a flow chart of a portion of a data collector 140, such as the data collector 60 included in the compensation manager 54, includes presenting 142 in a GUI one or more sources of employment data such as the employment market monitor 16 or the company 14. In some arrangements an employment data source provides survey data from numerous companies associated with a particular market or geographical location. After presenting the employment data, the data collector 140 receives 144 one or more user selections that identify selected employment data sources and collects 146 employment data (e.g., employment market surveys) from the selected sources. In some arrangements, the data collector 140 accesses a website associated with a source to download survey data. After collecting the employment data, the data collector 140 presents 148 in a GUI, such as GUI 84 (shown in FIG. 4), data representing the collected employment data along with, for example, the identity of the data source and indicators that identify the different types of downloaded surveys. After presenting the collected employment data, the data collector 140 receives 150 one or more user selections that indicate the particular employment data or portion of the employment data to be compared to employment data from another company, such as company 12. Also, the data collector 140 typically stores 152 the collected employment data along with the user selections in a storage device such as storage device 34.

Figure 11:
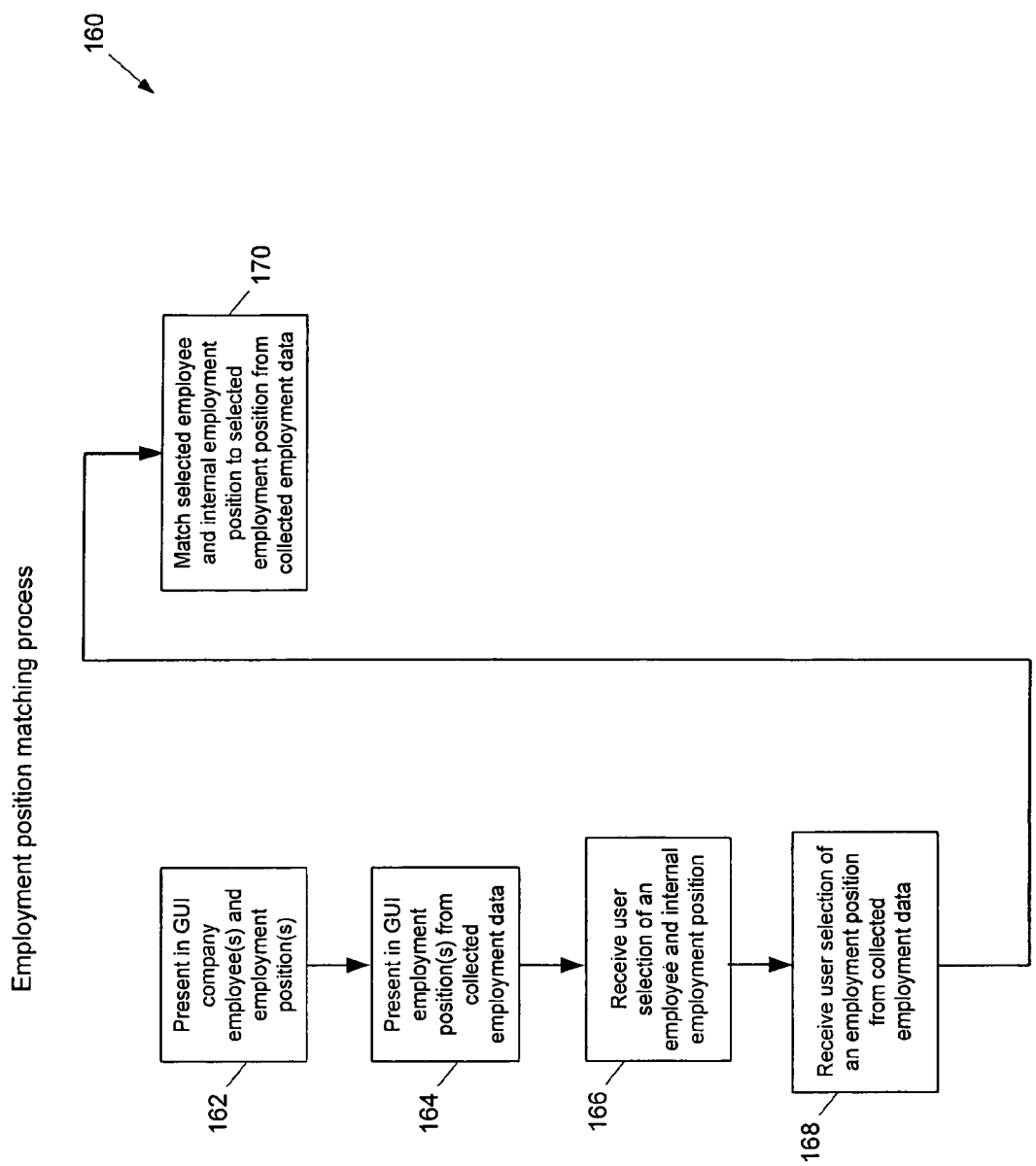
FIG. 11 is a flow chart of an employment position matching process.

Referring to FIG. 11, a flow chart of an employment position matching process 160, such as the employment position matching process 62 included in the compensation manager 54, includes presenting 162 in a GUI, such as GUI 90 (shown in FIG. 5) a list of individual employees of a company such as company 12 and their employment positions. The employment position matching process 160 also presents 164 in the GUI employment positions that are included in the employment data collected by a data collector such as data collector 60 (shown in FIG. 2) from a different source than company 12. Typically, the employment positions from both sources are presented with one or more graphical representations (e.g., a list, a spreadsheet, etc.) so that the user can relatively quickly differentiate each employment position and their respective sources. After the employment positions are presented in the GUI, the employment position matching process 160 receives 166 a user-selection associated with one employee and his or here employment position at company 12, referred to here as an internal employment position, and receives 168 a user-selection associated with one employment position in the collected employment data. Typically, the employment position matching process 160 also receives more user-selections for matching other individual employees, and their internal employment positions, and employment positions included in the collected employment data. After the user selections are received, the employment position matching process 160 matches 170 the selected employee and internal employment position to the selected employment position from the collected employment data. In some arrangements data representing the matched employment positions are stored in a storage device such as the storage device 34 by the position matching process 160 so that the data can be retrieved for use by another process such as a compensation comparing process.

Figure 12:
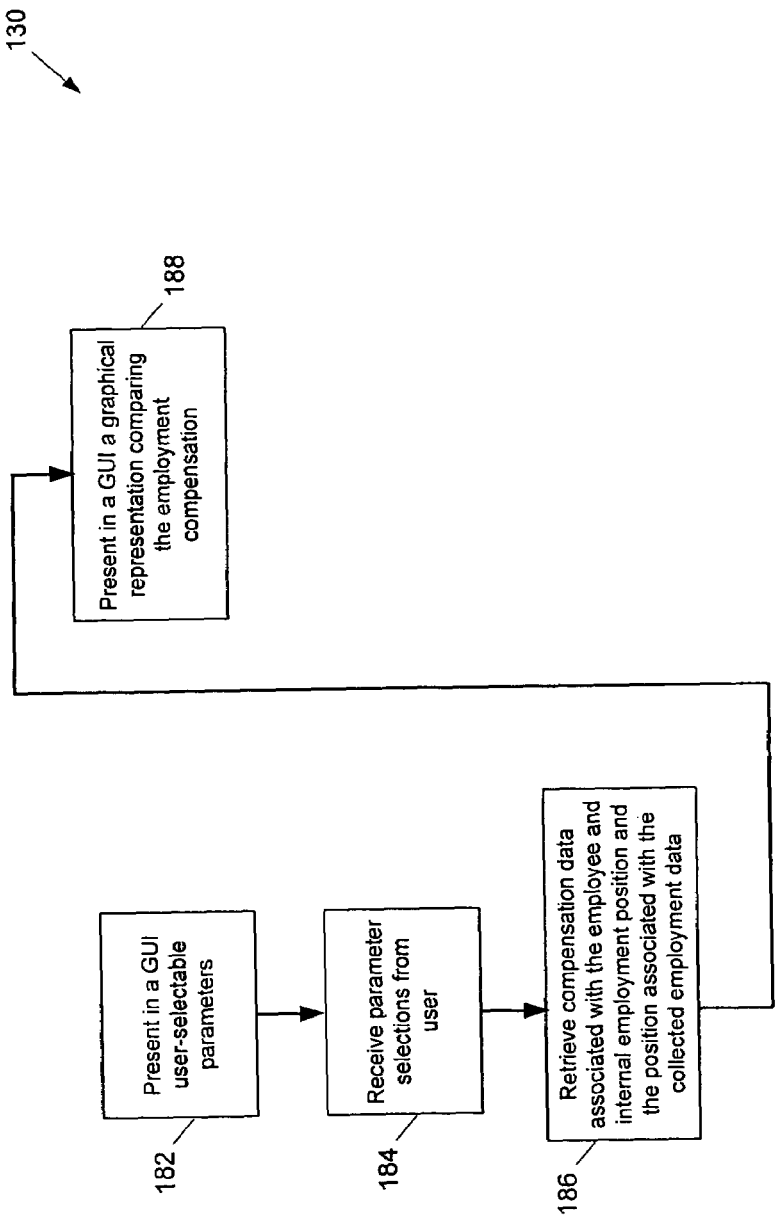
FIG. 12 is a flow chart of a compensation comparing process.

Referring to FIG. 12, a flow chart of a compensation comparing process 180, such as the compensation comparing process 64 in the compensation manager 54, includes presenting 182 in a GUI, such as GUI 100 (shown in FIG. 6), user-selectable parameters for comparing the compensation of one or more individual employees and corresponding internal employment positions and the compensation of one or more employment positions at other companies or collected in an employment survey. In some arrangements the user-selectable parameters include, for example, the type of compensation (e.g., base salary, bonuses, total compensation, benefits, etc.), compensation time unit (e.g., annual, weekly, etc.) and the type of currency (e.g., US dollars, etc.) to use in the comparison. Along with making selections from the parameters, the user also selects the employment positions, along with one or more individual employees, to have their respective compensation compared. In some scenarios the user selects to compare the compensation of an individual employee to the compensation of similar employment positions at other companies. In another scenario, the user selects to compare the compensation of a particular employment position at his or her company with similar employment positions at other companies as provided by survey data. Typically after the selectable parameters are presented to the user, selections are made and the compensation comparing process 180 receives 184 the parameter selections. Based on the selected parameters, the compensation comparing process 180 retrieves 186 compensation data associated with the selected employee and internal employment position and compensation data associated with the employment position or positions at other companies. For example, the internal employment position compensation data is retrieved from the employee database 44 stored in the storage device 34 and the compensation data associated with other companies is retrieved from survey data stored in the market database 52 that is downloaded from the employment market monitor 16. After retrieving the compensation data, the compensation comparing process 180 presents 188 in a GUI, such as GUI 100, a graphical representation that compares the compensation of the particular employee and his or her internal position and the compensation associated with one or more similar employment positions at other companies. By presenting a graphical representation (e.g., bar chart, X-Y line chart, pie chart, etc.) the user is capable of relatively quickly determining if there are significant compensation differences and if proposing a compensation adjustment is warranted.

Figure 13:
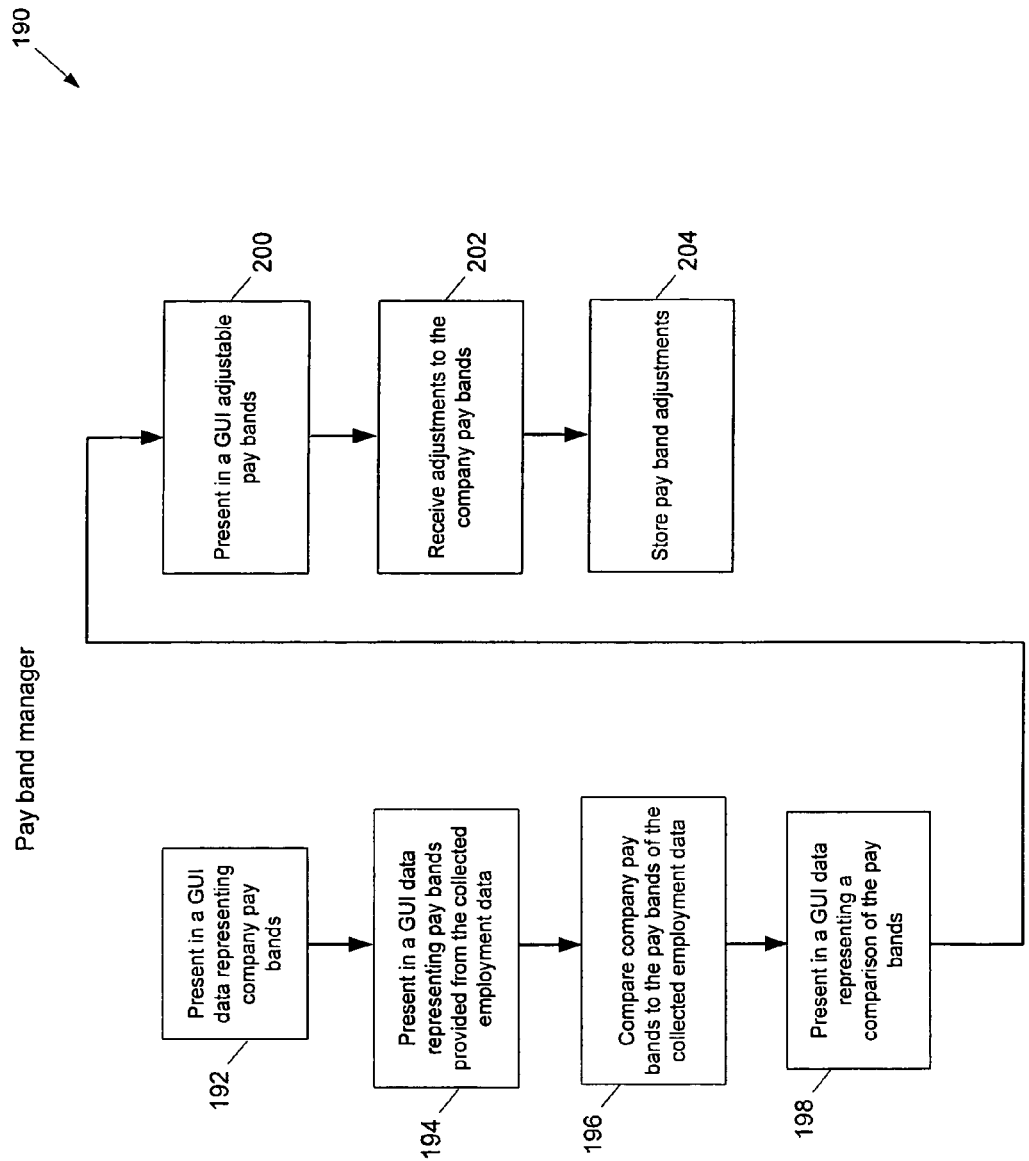
FIG. 13 is a flow chart of a pay band manager.

Referring to FIG. 13, a flow chart of a pay band manager 190 that includes the functionality of processes such as the pay band monitor 66, the pay band comparing process 68, and the pay band adjuster 70, includes presenting 192 in a GUI, such as GUI 110 (shown in FIG. 7), data representing the pay bands used by a company such as company 12. The pay band manager 190 also presents 194, in the same or a separate GUI, data representing the pay bands used by one or more other companies or data that represents a statistical measure (e.g. average) of pay bands across a particular market segment. The pay band manager 190 also includes comparing 196 the company pay bands to the respective pay bands of the other company or the market. For example, the pay band manager 190 calculates the percent difference between the respective pay bands to provide a numerical measure of the differences between the bands. After the comparison is completed, the pay band manager 190 presents 198 comparison data in a GUI such as GUI 116 (shown in FIG. 8).

Based on the pay band comparison, the user may decide to propose a change to the company pay bands for improved tracking of the other company pay bands or the current market pay bands. To allow the user to propose adjustments to the company pay bands, the pay band manager 190 presents 200 in a GUI, such as GUI 126 (shown in FIG. 9), adjustable pay bands. For example the GUI may include textual fields for entering minimum and maximum compensation levels for each pay band. In another example, adjustable pay bands may be presented in the GUI with a graphical representation (e.g., extendable bars, extendable columns, etc.) so that the user can use a pointing device (e.g., a mouse) to adjust the range of compensation assigned to each pay band. Furthermore along with adjusting, adding, or removing individual pay bands, the pay band manager 190 is also capable of allowing the user to adjust, add, or delete one or more pay steps that are associated with a particular pay band. After presenting the adjustable pay bands, the pay band manager 190 receives 202 data from the user that represents adjustments to the pay bands and stores 204 the pay band adjustments, for example, in a storage device such as storage device 34 so that the data can be used in producing a proposal to change the pay bands. Also, in some arrangements the adjustments to the pay bands are sent to other processes (e.g., a job budgeter) so that the proposed adjustments can be used to determine their affect, for example, in budgeting and bidding jobs. Furthermore, by providing the proposed pay band adjustments to other processes, the compensation manager 190 can be provided feedback that may support the adjustments or suggest other pay band adjustments.

Figure 14:
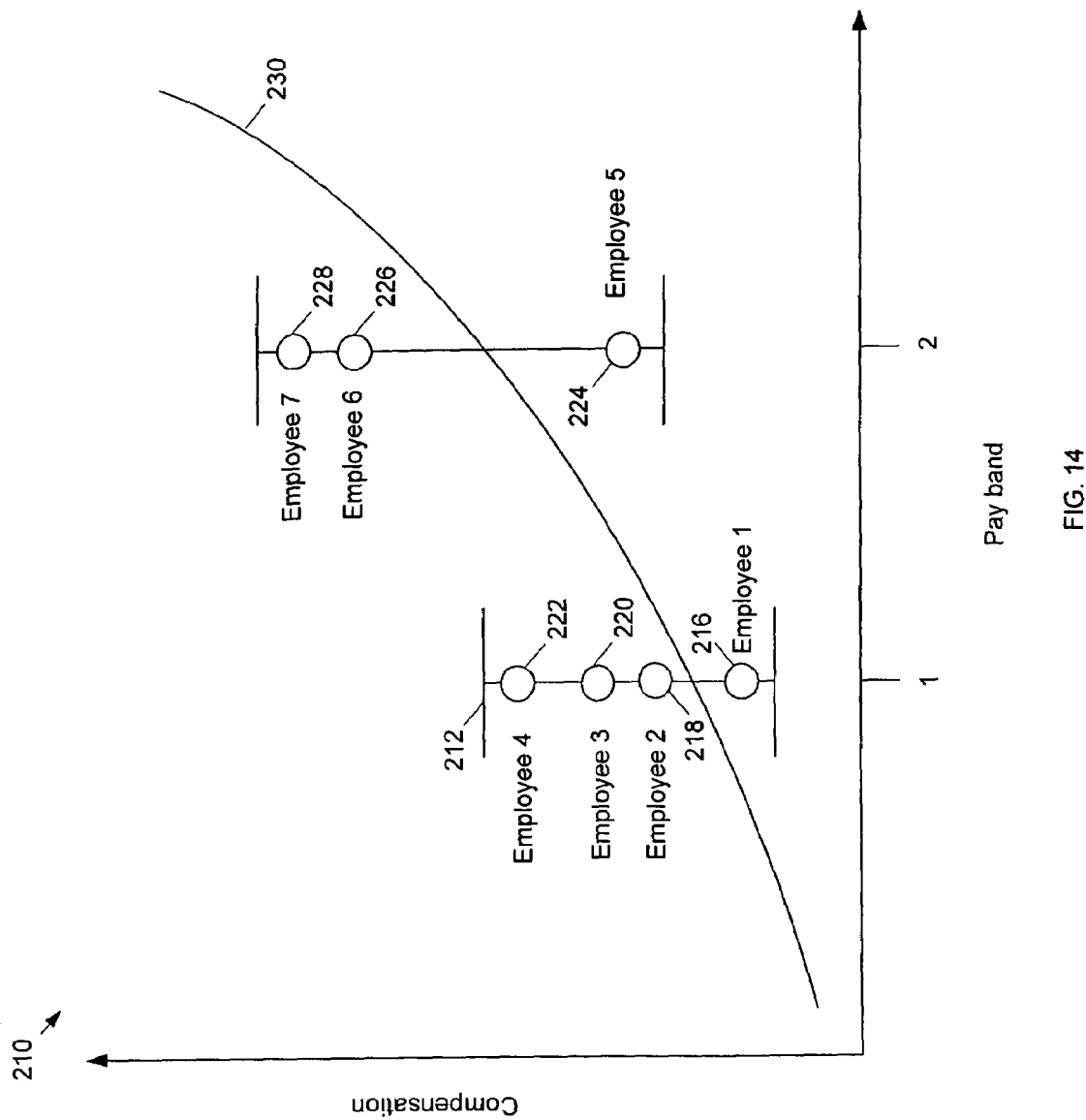
FIG. 14 depicts a compensation comparison chart.

Referring to FIG. 14, besides using a bar chart to compare compensation in the graphical chart 108 (shown in FIG. 6), an X-Y chart 210 can be presented with or without the bar chart. In this example, the x-axis of the chart 210 represents pay bands and the y-axis represents compensation. Each of the pay bands (e.g., pay band 1, pay band 2) includes bars 212, 214 that connect specific data points representing particular employee compensation within that pay band. For example, the bar 212 associated with pay band 1 includes data points 216-222 that respectively represent the compensation of four individual employees within the pay band 1. Similarly the bar 214 associated with pay band 2 includes data points 224-228 that represent of compensation of three individual employees in pay band 2. By presenting data associated with each pay band, the viewer can compare the compensation of the represented employees along with differentiating the compensation range of each pay band. In this particular example, the bar 214 associated with pay band 2 has a larger range than the bar 212 associated with pay band 1. Also, a regression line 230 is provided on the X-Y chart so that the viewer can gauge compensation differences between pay bands. Furthermore, while this example presents data points representing the compensation of employees at one company, in other arrangements additional data points are presented that represent employees employed at more than one company.

Figure 15:
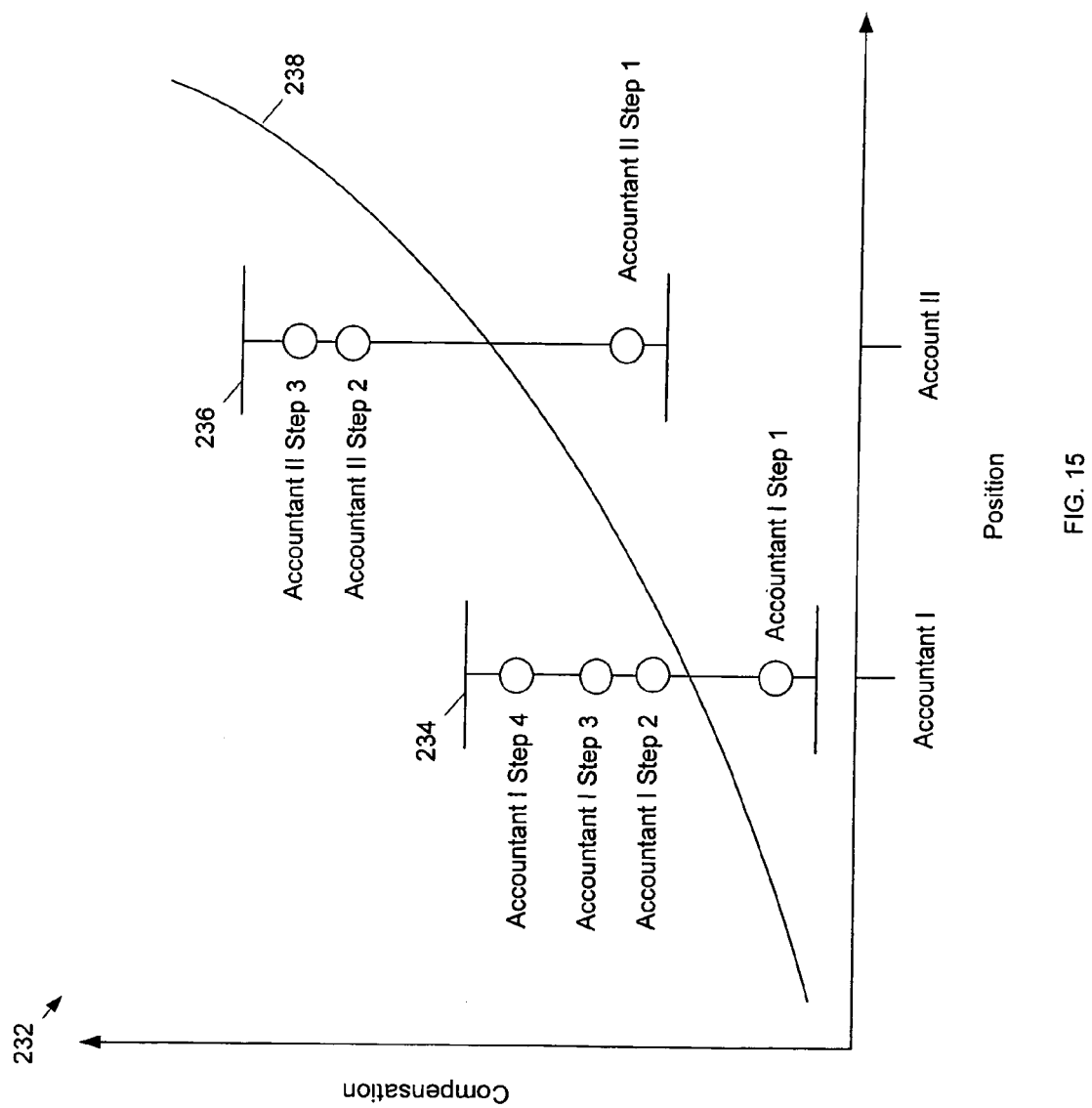
FIG. 15 depicts another compensation comparison chart.

Referring to FIG. 15, besides representing pay band on the x-axis of an X-Y chart 232, other types of employment information can be represented. In this example, a particular family of employment positions (e.g., accountant positions) is represented on the x-axis and compensation is represented on the y-axis. Similar to the previous chart 210, each employment position has bars 234, 236 that extend in the y-axis direction and include data points representing pay steps associated with of the employment position family members. Also, a regression line 238 is provided for the viewer to for comparing the family members. In other arrangements, other types of data are represented on the x-axis. For example, instead of representing a family of employment positions, the x-axis may represent different regions of a country (e.g., east coast, west coast, etc.) or portions of the globe (e.g., western hemisphere, middle east, eastern Europe, etc.). Furthermore, instead of representing compensation on the y-axis, another metric (e.g., stock options granted, benefits, bonuses, etc.) is represented on the y-axis.

Figure 16:
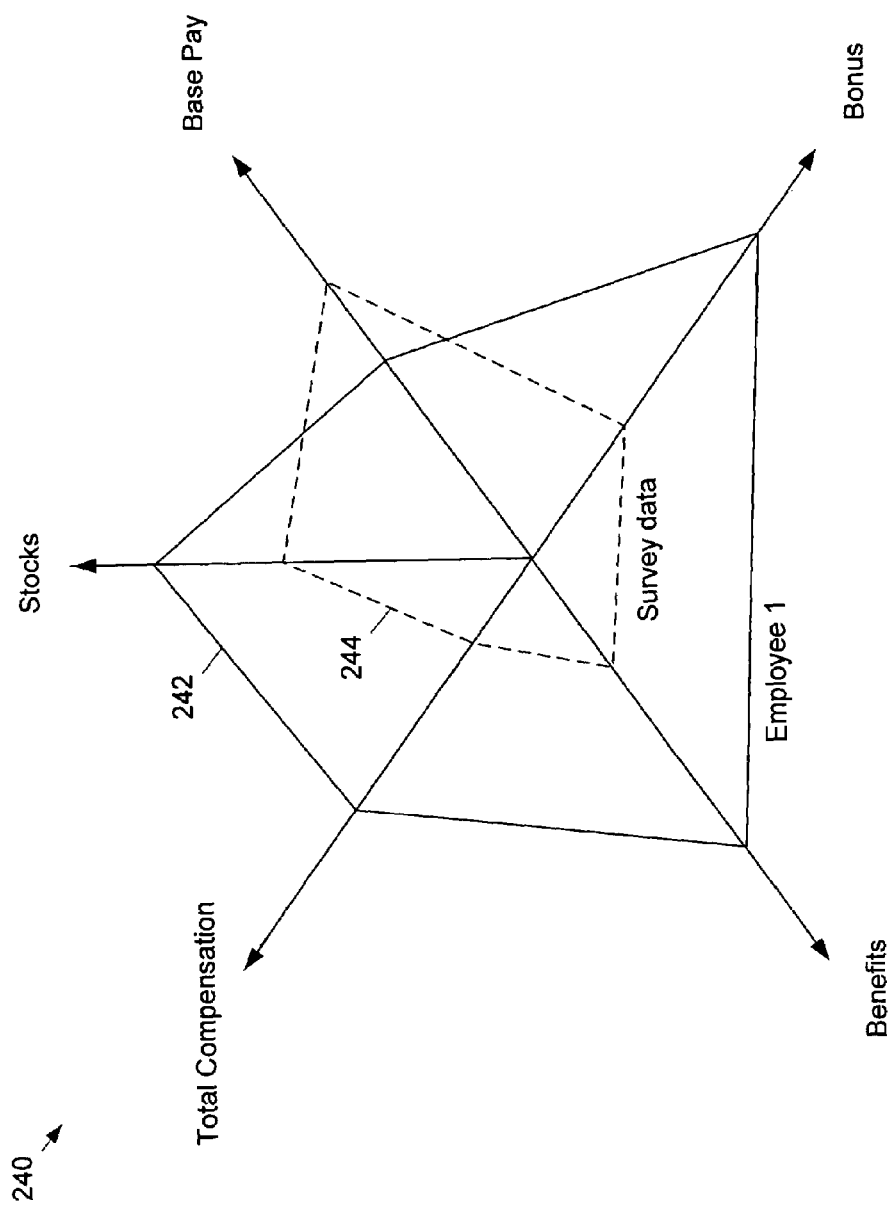
FIG. 16 depicts another compensation comparison chart.

Referring to FIG. 16, besides using charts that include two axes, in some arrangements, charts with more than two axes are presented in the graphical chart 108 in GUI 100. In this example, a multi-axis chart 240 that includes five axes for comparing compensation data associated with a particular employee and survey compensation data. Here, each of the five axis respectively represent stock options granted, base pay, bonus pay, benefits, and total compensation, although in other arrangements other compensation metrics are represented. The multi-axis chart 240 also includes a trace line 242 produced by connecting data points on each axis representing the compensation values associated with a particular employee of company 12. Similarly, the multi-axis chart 240 includes a trace line 244 that represents compensation values associated with collected survey data. By presenting the multi-axis chart 240 in graphical chart 108, the viewer can quickly compare the trace lines 242, 244 and differentiate the compensation values represented on each axis.

Figure 17:
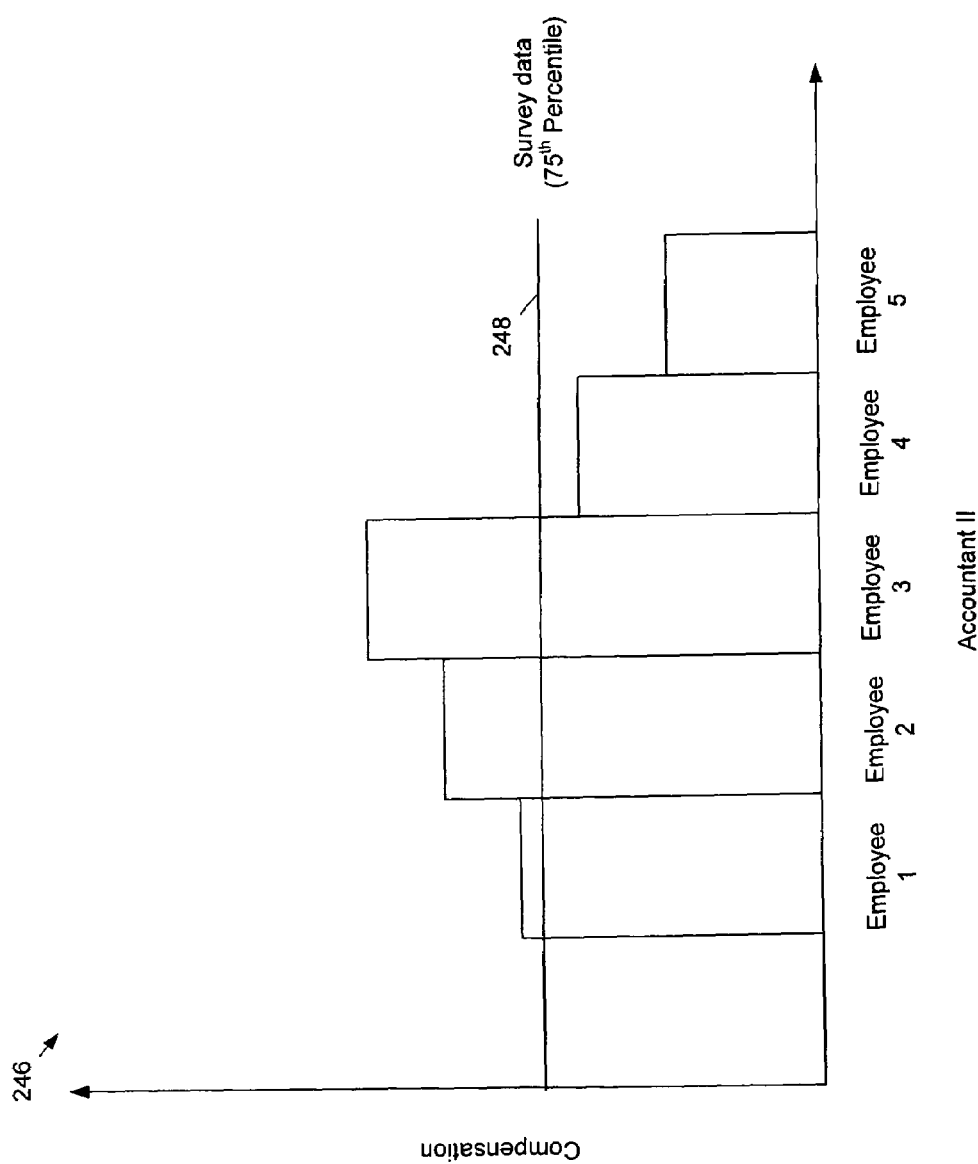
FIG. 17 depicts another compensation comparison chart.
Figure 18:
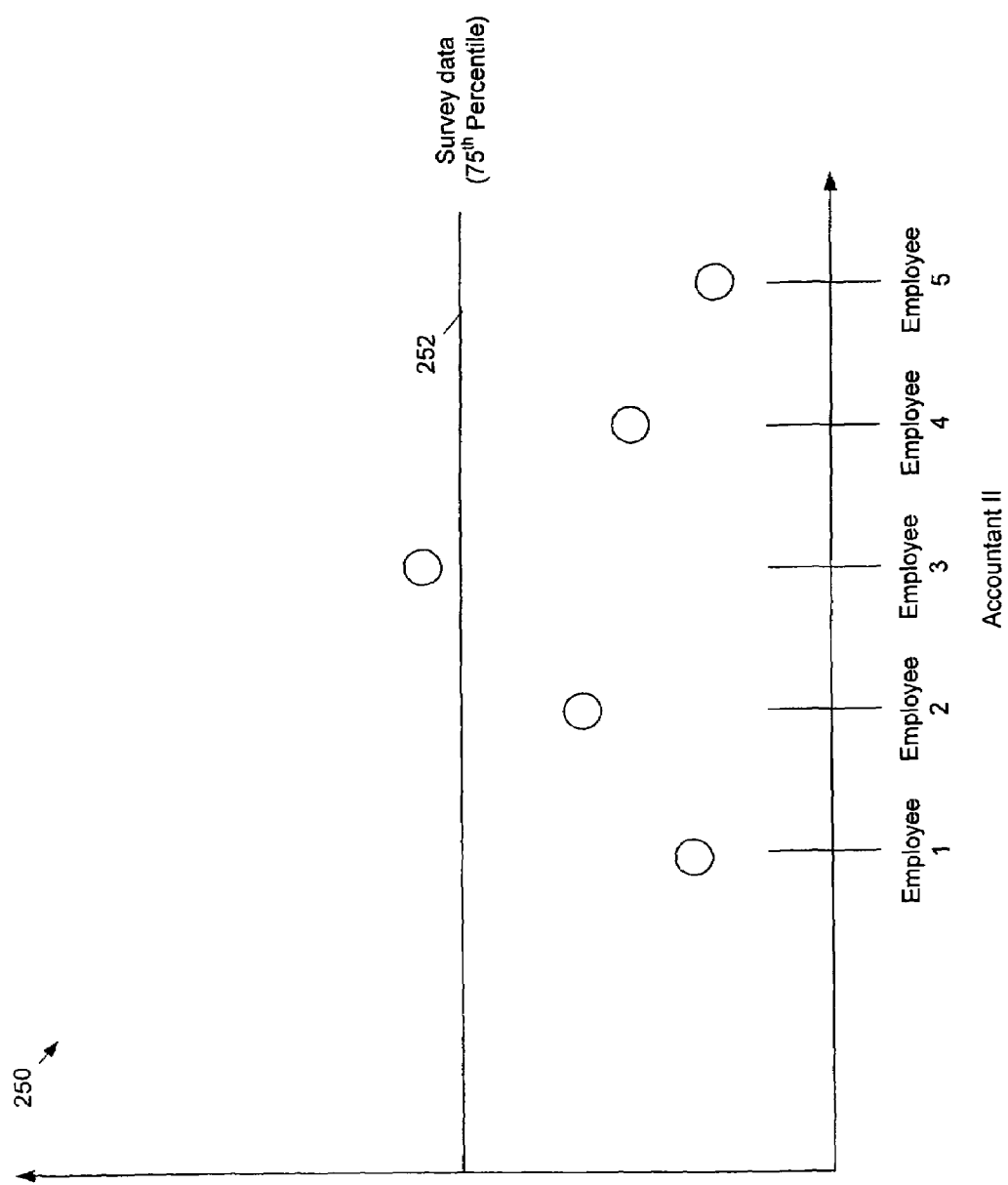
FIG. 18 depicts another compensation comparison chart.

Referring to FIG. 17, in another example, a bar chart 246 is presented in the graphical chart 108 in GUI 100 to compare compensation of multiple employees employed by company 12 along with compensation survey data. Each bar that extends along the x-axis of the bar chart 246 is used to represent compensation levels that extend along the y-axis. In this example each of the five employees represented by the bars are included in the one particular family of employment positions (e.g., accountant II, etc.). The bar chart 246 also includes a trace line 248 that represents compensation survey data. In this example, the trace line 248 represents the $75^{th}$ percentile compensation value for the family of employment positions; however, the trace line may represent other types of compensation levels (e.g., $25^{th}$ percentile, median compensation, etc.). Referring to FIG. 18, besides using a bar chart, an X-Y chart 250 is used to present the employee compensation data from a the particular employment position family (e.g., accountant II, etc.). Similarly, survey data (e.g., the $75^{th}$ percentile) is represented with a trace line 252.

Figure 19:
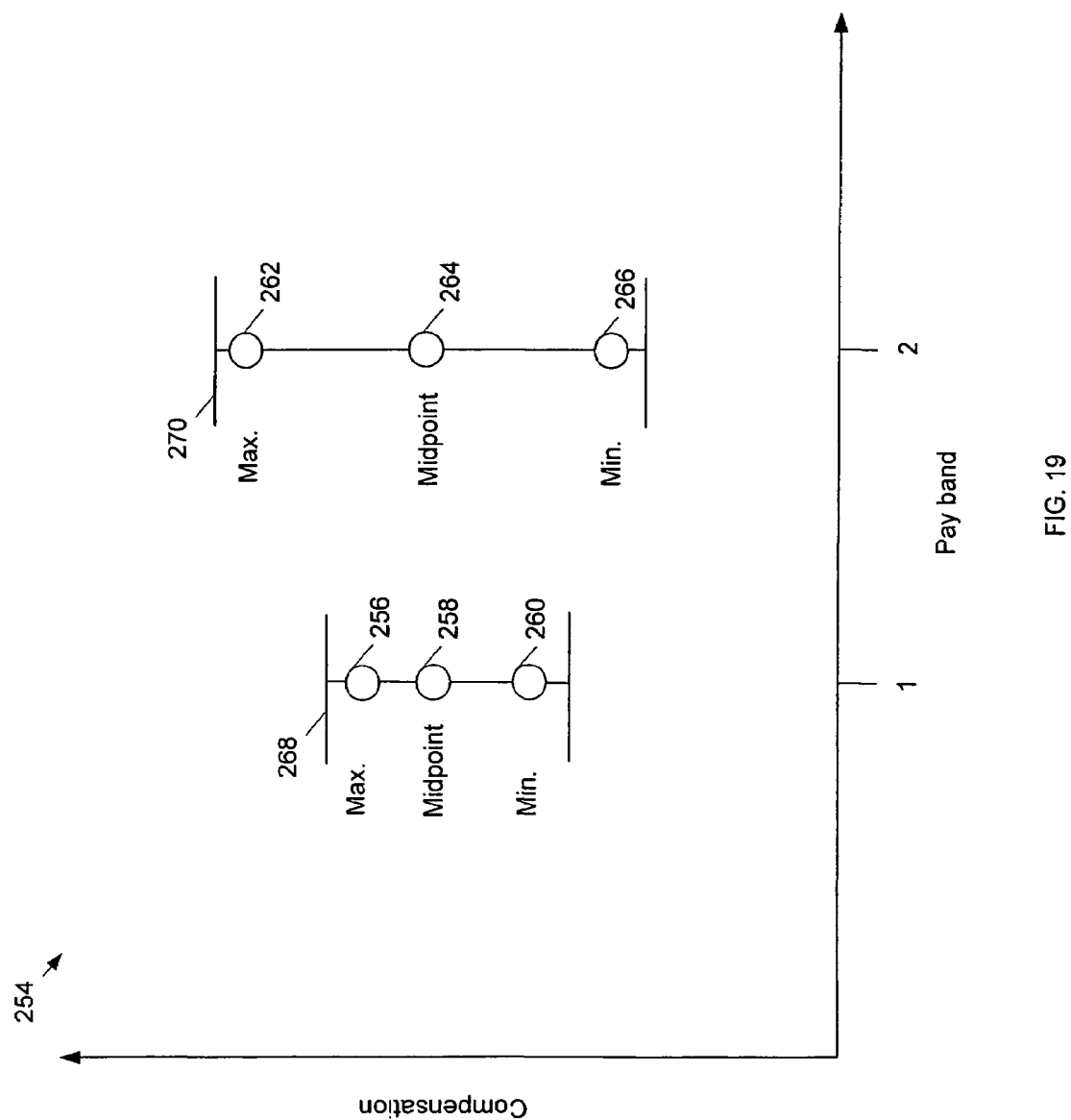
FIG. 19 depicts another compensation comparison chart.

Referring to FIG. 19, in still another example, besides presenting compensation data associated with individual employees, a graphical chart can be presented in GUI 100 for comparing company implemented pay bands. For example, X-Y chart 254 is presented in GUI 100 and provides data points 256-266 that represent minimum compensation values, maximum compensation values, and midpoint compensation values associated with each pay band. Bars 268 and 270 are used to respectively connect the data points so that the viewer can differentiate the compensation ranges between the pay bands. In this example, the pay band 2 has a larger range of compensation values than pay band 1 as demonstrated by the longer vertical length of bar 270 than bar 268. Also, while this example, presents data points associated with two pay bands, in other examples, data points associated with other pay bands are included in the X-Y chart 254. While each of the graphical charts shown in FIGS. 14-19 are individually presented, in some arrangements two or more graphical charts may be presented in the GUI 100.

The compensation manager 54 along with other processes such as the data collector 60 can be implemented in digital electronic circuitry, or in computer hardware, firmware, software, or in combinations of them. The processes can be implemented as a computer program product, i.e., a computer program tangibly embodied in an information carrier, e.g., in a machine-readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the processes can be performed by one or more programmable processors executing a computer program to perform functions of the record extractor by operating on input data and generating output. Method steps can also be performed by, and apparatus of the record extractor can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the record extractor, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other implementations are also within the scope of the following claims.

The invention claimed is:

1. A computer-implemented method for monitoring employment compensation, comprising:

receiving first compensation information of a first company from a first database, the first compensation information including salary information for employment positions of the first company and a first group of pay bands into which the employment positions of the first company are assigned, the pay bands of the first group of pay bands specifying a sub-range of discrete compensation levels for the employment positions assigned to the respective pay bands, wherein the first group of pay bands collectively specify a compensation continuum of employment positions of the first company;

receiving second compensation information associated with a second company from a second database, the second company being different from the first company, wherein the second compensation information includes salary information for employment positions at the second company and a second group of pay bands into which the employment positions of the second company are assigned, the pay bands of the second group of pay bands specifying a sub-range of discrete compensation levels for the employment positions assigned to the respective pay bands, wherein the second group of pay bands collectively specify a compensation continuum of employment positions of the second company;

receiving, by a computer, a selection of a first employment position of the first company, and in response to the selected first employment position, determining, using a processor, at least one second employment position of the second company matching the first employment position;

presenting, in a graphical user interface (GUI), a graphical representation illustrating a difference in compensation by comparing a first pay band of the first group of pay bands to which the first employment position is assigned with a second pay band of the second group of pay bands to which the at least one second employment position is assigned; and calculating, by the computer, a first percent difference between a first maximum compensation value of the first pay band and a second maximum compensation value of the second pay band, and a second percentage difference between a first minimum compensation value of the first pay band and a second minimum compensation value of the second pay band.

2. The method of claim 1, further comprising:

changing compensation information associated with the first company based on the comparison.

3. The method of claim 1, wherein the compensation information associated with the second company includes survey data.

4. The method of claim 1, wherein the graphical representation includes a bar chart.

5. The method of claim 1, further comprising:

storing the compensation information associated with the second company in a storage device.

6. The method of claim 2, further comprising:

storing the changed compensation information associated with the first company in a storage device.

7. The method of claim 2, wherein changing the compensation information associated with the first company includes changing a graphical representation of the compensation information associated with the first company.

8. A computer program product, tangibly embodied in a computer-readable storage device, the computer program product being operable to cause a machine to:

receive first compensation information of a first company from a first database, the first compensation information including salary information for employment positions of the first company and a first group of pay bands into which the employment positions of the first company are assigned, the pay bands of the first group of pay bands specifying a sub-range of discrete compensation levels for the employment positions assigned to the respective pay bands, wherein the first group of pay bands collectively specify a compensation continuum of employment positions of the first company;

receive second compensation information associated with a second company from a second database, the second company being different from the first company, wherein the second compensation information includes salary information for employment positions at the second company and a second group of pay bands into which the employment positions of the second company are assigned, the pay bands of the second group of pay bands specifying a sub-range of discrete compensation levels for the employment positions assigned to the respective pay bands, wherein the second group of pay bands collectively specify a compensation continuum of employment positions of the second company;

receive a selection of a first employment position of the first company, and in response to the selected first employment position, determining, using a processor, at least one second employment position of the second company matching the first employment position;

present, in a graphical user interface (GUI), a graphical representation illustrating a difference in compensation by comparing a first pay band of the first group of pay bands to which the first employment position is assigned with a second pay band of the second group of pay bands to which the at least one second employment position is assigned; and calculate a first percent difference between a first maximum compensation value of the first pay band and a second maximum compensation value of the second pay band, and a second percent difference between a first minimum compensation value of the first pay band and a second minimum compensation value of the second pay band.

9. The computer program product of claim 8, being further operable to cause a machine to:
change compensation information associated with the first company based on the comparison.

10. The computer program product of claim 8, wherein the compensation information associated with the second company includes survey data.

11. The computer program product of claim 8, wherein the graphical representation includes a bar chart.

12. The computer program product of claim 8, being further operable to cause a machine to:
store the compensation information associated with the second company in a storage device.

13. The computer program product of claim 9, being further operable to cause a machine to:
store the changed compensation information associated with the first company in a storage device.

14. The computer program product of claim 9, wherein changing the compensation information associated with the first company includes changing a graphical representation of the compensation information associated with the first company.

15. A computer hardware system comprising:
a data collector receiving first compensation information of a first company from a first database, the first compensation information including salary information for employment positions of the first company and a first group of pay bands into which the employment positions of the first company are assigned, the pay bands of the first group of pay bands specifying a sub-range of discrete compensation levels for the employment positions assigned to the respective pay bands, wherein the first group of pay bands collectively specify a compensation continuum of employment positions;
the data collector further receiving second compensation information associated with a second company from a second database, the second company being different from the first company, wherein the second compensation information includes salary information for employment positions at the second company and a second group of pay bands into which the employment positions of the second company are assigned, the pay bands of the second group of pay bands specifying a sub-range of discrete compensation levels for the employment positions assigned to the respective pay bands, wherein the second group of pay bands collectively specify a compensation continuum of employment positions of the second company;
a computer comprising:
(a) an employment position matching component receiving a selection of a first employment position of the first company, and in response to the selected first employment position, determining at least one second employment position of the second company matching the first employment position;
(b) a compensation comparing component presenting, in a graphical user interface (GUI), a graphical representation illustrating a difference in compensation be comparing a first pay band of the first group of pay bands to which the first employment position is assigned with a second pay band of the second group of pay bands to which the at least one second employment position is assigned; and
(c) a difference calculator calculating a first percentage difference between a first maximum compensation value of the first pay band and a second maximum compensation value of the second pay band, and a second percentage difference between a first minimum compensation value of the first pay band and a second minimum compensation value of the second pay band.

16. The system of claim 15, wherein the computer hardware system changes compensation information associated with the first company based on the comparison.

17. The system of claim 15, wherein the compensation information associated with the second company includes survey data.

18. The system of claim 15, wherein the graphical representation includes a bar chart.

19. The system of claim 15, wherein the computer hardware system stores the compensation information associated with the second company in a storage device.

20. The system of claim 16, wherein the computer hardware system stores the changed compensation information associated with the first company in a storage device.

21. The system of claim 16, wherein changing the compensation information associated with the first company includes changing a graphical representation of the compensation information associated with the first company.

22. The method of claim 1, further comprising:
receiving a user input to the graphical representation;
modify the first pay band on the graphical representation according to the user input.

23. The computer program product of claim 8, being further operable to cause a machine to:
receive a user input to the graphical representation;
modifying the first pay band on the graphical representation according to the user input.

24. The system of claim 16, further comprising:
a pay band adjuster receiving a user input to the graphical representation, and modifying the first pay band on the graphical representation according to the user input.

25. The method of claim 22, wherein modifying the first pay band includes adjusting the first minimum and the first maximum compensation values of the first pay band.

26. The computer program product of claim 23, wherein modifying the first pay band includes adjusting the first minimum and the first maximum compensation values of the first pay band.

27. The system of claim 24, wherein modifying the first pay band includes adjusting the first minimum and the first maximum compensation values of the first pay band.

* * * * *